United States Patent
Kotaru

(10) Patent No.: US 12,475,315 B2
(45) Date of Patent: Nov. 18, 2025

(54) ADAPTING FOUNDATION MODELS FOR INFORMATION SYNTHESIS OF WIRELESS COMMUNICATION SPECIFICATIONS

(71) Applicant: Microsoft Technology Licensing, LLC, Redmond, WA (US)

(72) Inventor: Manikanta Kotaru, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 164 days.

(21) Appl. No.: 18/326,666

(22) Filed: May 31, 2023

(65) Prior Publication Data

US 2024/0330589 A1    Oct. 3, 2024

Related U.S. Application Data

(60) Provisional application No. 63/493,594, filed on Mar. 31, 2023.

(51) Int. Cl.
*G06F 40/284* (2020.01)
*G06F 40/205* (2020.01)
*H04W 24/02* (2009.01)

(52) U.S. Cl.
CPC .......... *G06F 40/284* (2020.01); *G06F 40/205* (2020.01); *H04W 24/02* (2013.01)

(58) Field of Classification Search
None
See application file for complete search history.

(56) References Cited

U.S. PATENT DOCUMENTS 11,860,914 B1 *  1/2024  Qadrud-Din .......... G06F 40/289
12,067,366 B1 *  8/2024  Heller .................... G06F 40/35
(Continued)

OTHER PUBLICATIONS

Holm, Henrik. "Bidirectional encoder representations from transformers (bert) for question answering in the telecom domain.: Adapting a bert-like language model to the telecom domain using the electra pre-training approach." (2021). (Year: 2021).*

(Continued)

*Primary Examiner* — Douglas Godbold

(57) ABSTRACT

Existing approaches to understanding, developing, and researching modern wireless communication technologies involve time intensive and arduous processes of sifting through numerous webpages and technical specification documents, gathering the required information and synthesizing it. The present disclosure describes a conversational artificial intelligence tool for information synthesis of wireless communication specifications. The system builds on recent advancements in foundation large language models (LLMs) and consists of three key additional components: a domain-specific database, a context extractor, and a feedback mechanism. The system appends user queries with concise contextual information extracted from a database of wireless technical specifications and incorporates tools for expert feedback and data contribution. On evaluation using a benchmark dataset of expert queries and responses, the system provided more relevant and accurate answers on topics related to modern wireless communication specifications with a BLEU (BiLingual Evaluation Understudy) score of 0.28 compared to 0.03 achieved by current state-of-the-art LLM-based systems.

20 Claims, 20 Drawing Sheets

(56) References Cited

U.S. PATENT DOCUMENTS

| | | | | |
|---|---|---|---|---|
| 12,105,729 | B1* | 10/2024 | Haq | G06F 16/338 |
| 12,243,646 | B1* | 3/2025 | Paul, Jr. | G16H 70/20 |
| 2024/0249081 | A1* | 7/2024 | UzZaman | G06F 40/40 |
| 2024/0386204 | A1* | 11/2024 | Sangarapillai | G06F 16/26 |
| 2024/0386313 | A1* | 11/2024 | Pedersen | G06F 40/30 |
| 2024/0430173 | A1* | 12/2024 | Coudert | H04W 16/18 |
| 2025/0053586 | A1* | 2/2025 | Nelson | G06F 40/289 |

OTHER PUBLICATIONS

Lian, Rongzhong, et al. "Learning to select knowledge for response generation in dialog systems." arXiv preprint arXiv:1902.04911 (2019). (Year: 2019).*

Lewis, Patrick, et al. "Retrieval-augmented generation for knowledge-intensive nlp tasks." Advances in neural information processing systems 33 (2020): 9459-9474. (Year: 2020).*

International Search Report and Written Opinion received for PCT Application No. PCT/US2024/019820 (Ms# 412916-PCT01), Jun. 18, 2024, 12 pages.

Peng, et al., "Check Your Facts and Try Again: Improving Large Language Models with External Knowledge and Automated Feedback", arXiv preprint arXiv:2302.12813, 2023, 14 pages.

* cited by examiner

MA — what is numerology in 5G

🌀 Numerology is not related to 5G technology. Numerology is a belief in the mystical significance of numbers and the practice of interpreting their meaning in the natural world and human experience. 5G, on the other hand, is the fifth generation of wireless network technology that provides faster data transfer speeds, lower latency, and improved network capacity compared to previous generations of wireless technology. 5G is used to support a variety of applications, including smartphones, Internet of Things (IoT) devices, and next-generation mobile networks. There is no connection between the two.

110

☐ Stop generating

FIG. 2 what is numerology in 5G — 205

210 — Numerology in 5G/NR refers to Sub Carrier Spacing (SCS). As of Release 17, there are 7 types of numerology (SCS 15, 30, 60, 120, 240, 480, 960, kHz). Numerology is used to represent the various subcarrier spacings in NR. The smallest subcarrier spacing is 15 kHz, and extended Cyclic Prefix (CP) is supported in 60 kHz subcarrier spacing. Each numerology is labeled as a parameter (μ, mu in Greek). The numerology (μ = 0) represents 15 kHz which is the same as LTE, and the subcarrier spacing of other μ is derived from (μ = 0) by scaling up in the power of 2. 7-pl 12-pl 👍 👎

400

1000

1400

1500

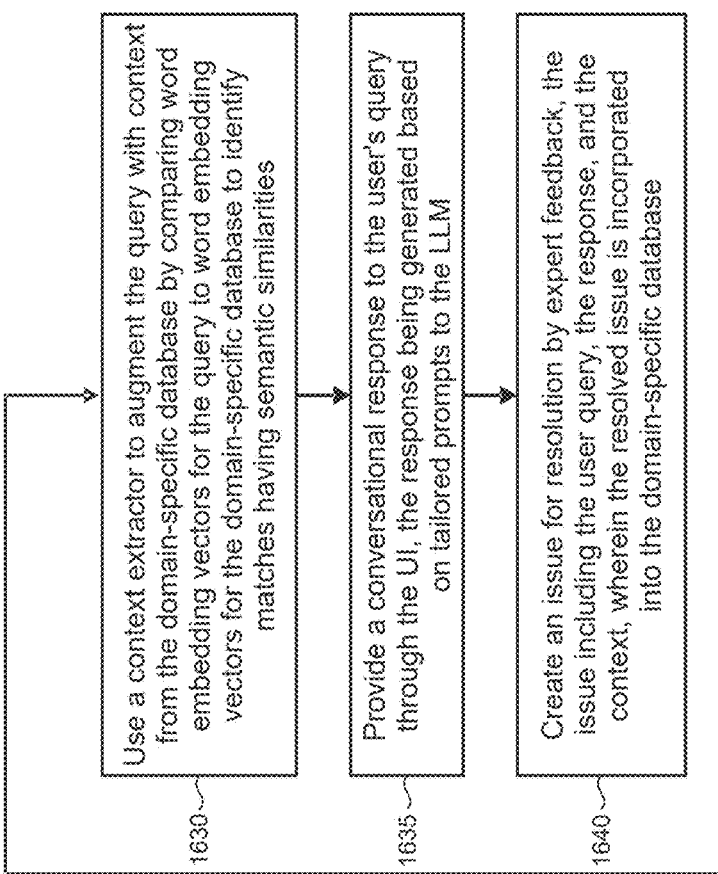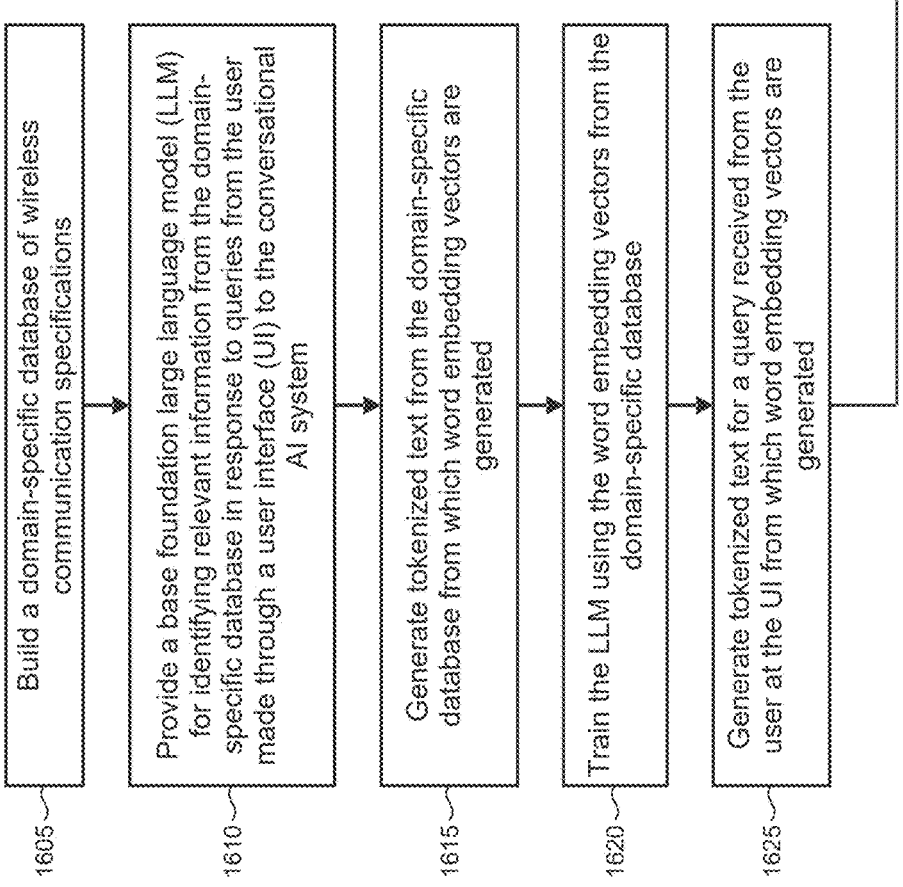
FIG. 16
1600

1900

ADAPTING FOUNDATION MODELS FOR INFORMATION SYNTHESIS OF WIRELESS COMMUNICATION SPECIFICATIONS

CROSS REFERENCE TO RELATED APPLICATIONS

This application claims priority to U.S. Patent Application Ser. No. 63/493,594, filed Mar. 31, 2023, the entirety of which is hereby incorporated herein by references for all purposes.

BACKGROUND

Fifth generation (5G) mobile networks offer the ability to connect tens of billions of intelligent devices, densely deployed and generating orders of magnitude more data to be handled by the network. Consumers' expectations for 5G mobile networks are high and mobile network operators will be under real pressure from enterprise customers to move quickly, delivering 5G's low latency, dense device, and high-performance capabilities to enable near-real-time management and control of critical business operations.

SUMMARY

Disclosed is a conversational artificial intelligence (AI) system which features a question-and-answer interface with advanced capabilities for providing accurate and relevant responses related to wireless communication specifications in the 5G mobile networking space. The system includes three elements, including a domain-specific database, a context extractor, and a feedback mechanism. It further incorporates mechanisms to overcome the limitations on input size to a foundation large language model (LLM), for citing information sources, and to enable expert data contributions. The system demonstrates a better BLEU (BiLingual Evaluation Understudy) score of 0.28 on a benchmark dataset compared to 0.03 achieved by existing conversational AI tools.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 1 shows an illustrative example of a chat session between a user and a conventional conversational AI tool;

FIG. 2 shows an example of a chat session between a user and the present conversational AI system;

FIG. 16 shows an illustrative method that may be performed when implementing the present conversational AI system;

Like reference numerals indicate like elements in the drawings. Elements are not drawn to scale unless otherwise indicated.

DETAILED DESCRIPTION

Figure 3:
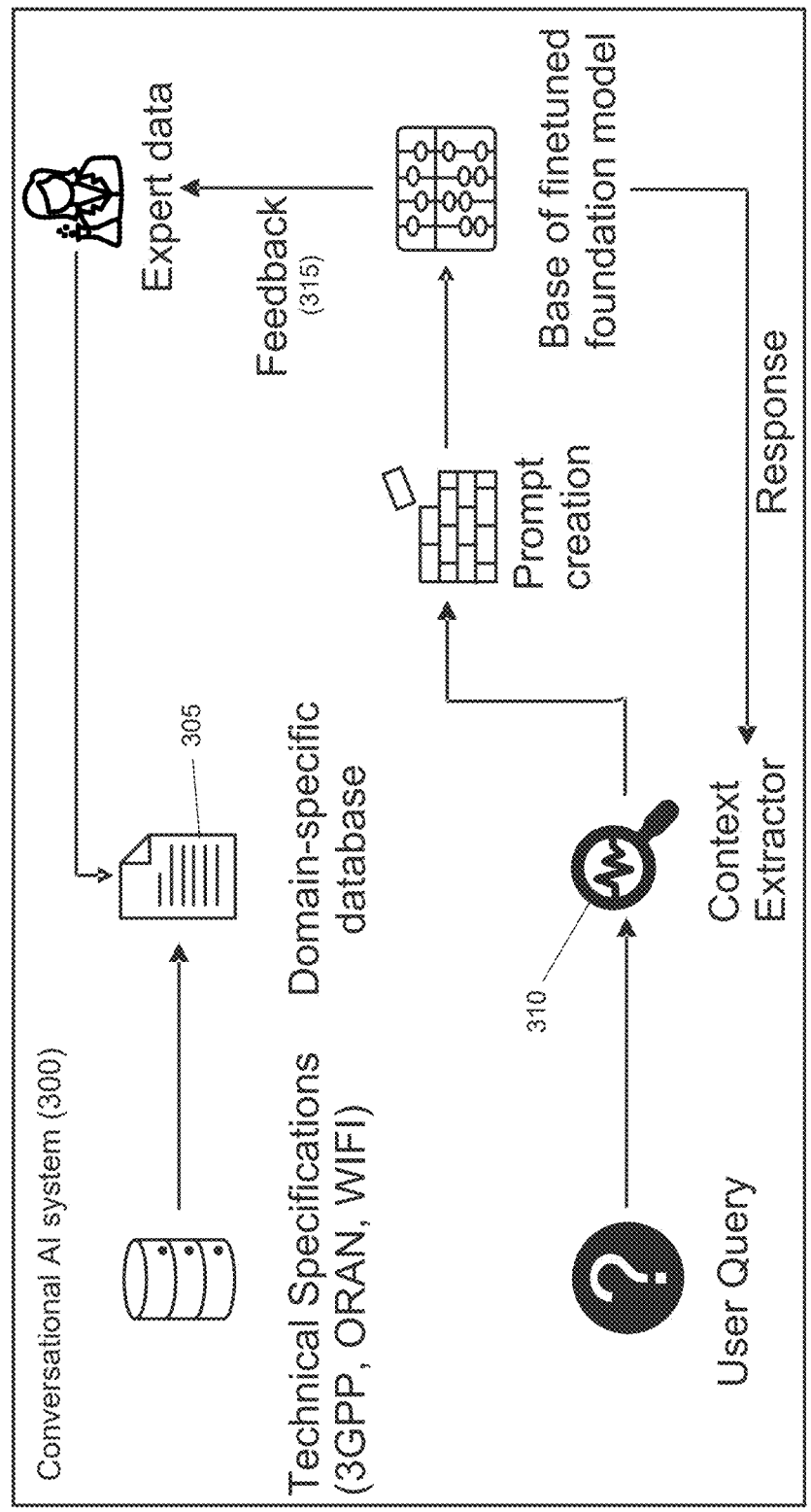
FIG. 3 shows an illustrative architecture for the present conversational AI system.

The complexity of technical specifications presents a formidable challenge in understanding, developing, researching, or modifying modern wireless communication technologies. Researchers, practitioners, engineers, and students can find themselves grappling with a multitude of acronyms and intricate terminology with information spread across a large number of documents. This situation can present onerous and time-consuming tasks with which to work and develop modern wireless communication technologies. For example, an engineering team working on implementing a registration request procedure as a part of building a 5G virtual core network would need to identify all the relevant technical specifications from among thousands of such documents and understand the call flow and message formats as described in those specifications. Table 1 provides several examples of such user stories.

TABLE 1

| User | Story |
| --- | --- |
| As a researcher, | I want to analyze the parameters that affect 5G MAC scheduling so that I can develop spectrally efficient resource scheduling algorithms. |
| As an engineer, | I want to identify all technical specifications relevant to handoff and understand the associated call flow so that I can implement handoff procedure. |
| As a systems integrator, | I want a clear specification of the fronthaul message format so that I can integrate open radio units with my far edge system. |
| As an enterprise 5G user, | I want to know about slicing and its configuration parameters, so that I can efficiently use it to enhance my network services. |
| As a student, | I want to learn about sounding reference signals so that I can understand the channel feedback mechanisms in practical wireless systems. |

The current method of acquiring this information involves sifting through numerous webpages and technical specification documents. While this approach provides extensive comprehension of a topic from various sources, it can also be very time-intensive and tedious to identify multiple relevant sources, gather information from them, and synthesize it. The emergence of foundation large language models (LLMs) such as, for example, ChatGPT presents a promising prospect for solving this problem as they represent a significant advancement in providing synthesized, readily comprehensible answers to user queries.

However, despite the usefulness of state-of-the-art foundation LLMs in answering many queries related to modern wireless communication technologies, they may offer irrelevant or inaccurate responses to many of these queries. For example, as shown in an illustrative chat session 100 in FIG. 1, when prompted about 'what is numerology in 5G' in the message bar 105, ChatGPT describes in the response 110 that numerology is related to the mystical significance of numbers and has no connection to 5G. Similarly, when prompted about 'the number of unique values physical identity can take in 5G', it responds that 'PCI consists of a 3-bit value ranging from 0 to 503', which is inaccurate and also non-sensible as a 3-bit value cannot take 504 different values.

The present disclosure is directed to a conversational AI system for information synthesis of wireless communication specifications. Similarly, as with conventional tools such as ChatGPT, the present conversational AI system offers a question-and-answer interface but with an enhanced ability to provide more accurate and relevant answers on topics pertaining to technical specifications of contemporary wireless communication specifications. The present conversational AI system is built upon foundation LLMs and features three key additional components:

1) Domain-specific database: Foundation LLMs like ChatGPT are trained on a large corpus of web data. However, technical specifications and related documents for modern wireless communication technologies are not readily accessible. For example, 3GPP ($3^{rd}$ Generation Partnership Project) Release 16 for 5G consists of thousands of technical specification documents spread across tens of compressed zip folders stored on an FTP (file transfer protocol) site. This leads to missed patterns hindering the ability of state-of-the-art foundation models to generate responses with patterns relevant to wireless communication systems. To address this, the present conversational AI system extracts text from different WiFi standards (e.g., as published by the WiFi Alliance and/or under IEEE 802.11) and technical specifications from 3GPP releases and O-RAN (Open Radio Access Network Alliance), which are publicly available, to supplement the foundation models.

2) Context Extractor: The present conversational AI system utilizes a context extractor to identify the most relevant text samples from a domain-specific database and provide them as context to either a base or fine-tuned foundation model. The combined context and user query generate a response, while the system stores the specification document identifier for citation purposes. A data segmentation procedure is incorporated so that the overall prompt still fits the input size of the LLMs.

3) Feedback: The present conversational AI system includes a feedback system that allows users to provide feedback/clarification from an expert, in addition to rating responses. When activated, the system generates an issue in a repository that contains the query, context, and response. This issue can be resolved with expert feedback and incorporated into the domain-specific database, improving the quality of future responses. Additionally, the response is fed back into the context extractor as supplementary context for subsequent queries.

In an illustrative example, the present conversational AI system is built on top of OpenAI's text-davinci-003 model and implemented using Python libraries for text extraction, similarity search, and prompt creation. A benchmark dataset with 150 query and reference response pairs on diverse wireless communication technology topics is created. The present conversational AI system outperforms ChatGPT responses with a superior BLEU (BiLingual Evaluation Understudy) score of 0.28 on the benchmark dataset compared to 0.03 for ChatGPT responses for the same queries.

The present disclosure discusses the application of foundation large language models and existing techniques to the context of wireless communication systems. The introduction of a benchmark dataset of expert queries and responses to evaluate information synthesis tools in the domain of wireless communication technologies is also disclosed. The present disclosure further describes a design and implementation of a wireless domain-specific information synthesis tool with mechanisms for citing the relevant specifications and for expert feedback and data contribution.

The present disclosure has some boundaries in scope: the present conversational AI system currently supports the synthesis of only textual information but not figures and code. The approach also increases the inference cost as the user query is appended with the context information. The system is intended for use by wireless domain practitioners but not to build fully automated systems based solely on its outputs.

A discussion of related work follows. Wireless communication specifications ensure interoperability and compatibility among devices and networks, which is essential for the successful operation and adoption of wireless communication technologies. The comprehension and development of wireless communication systems rely heavily on navigating technical specifications, whose difficulty is well-documented. Although there are tools available for managing 3GPP specifications, their functionality is restricted to accessing documents through their identification numbers, and monitoring updates to existing or new specifications. Resources to share and collect information about 5G in the form of articles and simulations have been developed to tackle the challenges to access, read, understand, and apply wireless communication specifications. In contrast, the present conversational AI system directly extracts pertinent information from the relevant specifications.

Recent approaches considered natural language processing (NLP) techniques for obtaining answers to telecommunications-related questions. These approaches fine-tuned the BERT (Bidirectional Encoder Representations from Transformers) language model using a small question-answering database created from 493 paragraphs, consisting of simple question-answer pairs like {question: How high can the modulation get in LTE?, answer: 64QAM} and {question: What is the highest data rate in LTE in down link?, answer: 300 Mbps}. The approach does not scale well to cover entire specification documents as it requires creating a large question-answer database. The present disclosure, in contrast, is directed at development of a conversational AI system that provides synthesized information in natural human-readable form for user queries. The queries can be related to any of the technical specification documents. Furthermore, the present conversational AI system provides citation to the technical specifications and incorporates a mechanism for expert feedback. The present disclosure also contributes a benchmark database consisting of detailed reference responses for the purpose of evaluating information synthesis tools in wireless communication systems.

LLMs have been used in the context of network protocol specifications in tasks outside of information synthesis to uncover ambiguous or under-specified sentences in specifications and generate code for protocol, and to semantically analyze 3GPP specifications to recover protocol vulnerabilities under predefined threat models. The paper titled "SPEC5G: A Dataset for 5G Cellular Network Protocol Analysis" by Imtiaz Karim, Kazi Samin Mubasshir, Mirza Masfiqur Rahman, and Elisa Bertino (2023), created annotated datasets for summarization and text-classification tasks by fine-tuning large language models with sentences extracted from 3GPP specifications. These approaches, based on fine-tuning alone, cannot cite to the relevant specifications or information source that provides an opportunity for the user to verify the information if needed. They lack mechanisms for expert feedback and the annotated datasets are invalid for tasks like information synthesis to obtain relevant information for user queries.

LLMs have become increasingly popular in recent years, with many researchers and companies exploring their potential applications. One of the earliest and most well-known examples of large language models is Google's BERT (Bidirectional Encoder Representations from Transformers), which was released in 2018. Since then, a number of models have been developed, including Generative Pretrained Transformer-3 (GPT-3), BLOOM, XLNet, and ChatGPT. These models have been trained on broad data that can be adapted to a wide range of downstream tasks language translation, question-answering, and text summarization and have been termed as foundation models.

Foundation LLMs represent the current state-of-the-art in furnishing users with intelligible responses to their inquiries. Foundation LLMs have been adapted to numerous domain-specific tasks through fine-tuning and prompt engineering approaches. Prompt engineering is widely researched to tailor LLMs to domain-specific knowledge; however, its application in the context of wireless communications remains unexplored.

Repository hosting services like GitHub have become indispensable platforms for software development and collaboration. Traditionally, GitHub issues have been used for code contributions, but the present conversational AI system re-purposes them for obtaining and managing expert data contribution.

With respect to the design of the present conversational AI system, a brief primer is first provided for foundation models and conversational AI systems based on foundation LLMs. Then, a description of the architecture and various components is provided.

LLMs are powerful natural language processing tools that can generate fluent and coherent text. The language model is designed to predict the following word or sub-word, called tokens, by analyzing the text it has observed thus far. To utilize the machine learning models, the user's input tokens need to be transformed into a numerical representation known as "input embeddings". During the training process, the model learns how to construct these embeddings so that similar vectors represent words with similar meanings.

The majority of the state-of-the-art LLMs are based on the transformer architecture described in the paper titled "Attention is All You Need" by Ashish Vaswani, Noam Shazeer, Niki Parmar, Jakob Uszkoreit, Llion Jones, Aidan N. Gomez, Lukasz Kaiser, and Illia Polosukhin (2017), which uses input embeddings to represent words as numbers that the model can understand. An encoder processes the input text and generates hidden states that capture its meaning and context, while a decoder generates the output sequence based on the encoded input sequence. Both input and output embeddings go through positional encoding, which helps the model understand the order of words in a sentence. During training, the model learns to generate these embeddings and guess the next word by looking at the words before it. Multiple layers of encoders and decoders are used in the transformer to improve performance on various natural language processing tasks such as language translation and conversational agents.

Fine-tuning is a technique in machine learning that involves adapting a pre-trained model to a specific domain by further training it on a new dataset. The process involves selecting a pre-trained model, preprocessing the target dataset to fit the format of the pre-trained model's input, and initializing the model with existing weights and architecture. During training, the weights of the model are updated to better fit the new data, using a chosen optimization algorithm and hyperparameters. Fine-tuning requires careful selection of target dataset and hyperparameters for optimal performance. This approach also requires repeated training when the target dataset is updated.

Prompt engineering is a technique used in language models to fine-tune the model's output for a specific task by providing tailored prompts as inputs to the model. Prompt engineering involves crafting a specific prompt that elicits the desired response from the model. The prompt can include various elements, such as keywords, context, and formatting, and can be optimized using various techniques such as grid search or reinforcement learning. The goal is to create a prompt that provides the right amount of information to the model without being too prescriptive, allowing the model to generate accurate and relevant output.

Prompt engineering has been successfully applied in various applications like sentiment analysis, question-answering, and adapting a pre-trained model to new data. However, this approach requires careful consideration of the prompt's content as the model's output may be biased towards the input prompt, which can lead to inaccurate or misleading results. Further, this approach requires domain expertise to create relevant prompts to achieve good performance.

FIG. 3 shows an illustrative architecture of the present conversational AI system 300. Prior to delving into the specifics, the following provides a concise summary of the operational procedure of the system. When a user types in a query in a message bar 205 as shown in FIG. 2, the system appends the query with relevant text samples from the domain-specific database and feeds the foundation model with the resulting combined prompt as the input. The response 210 is displayed to the user and is used as supplemental context to subsequent queries. The response includes options for feedback as well as a button to request assistance from an expert.

LLMs are typically trained on a massive corpus of web data that covers a broad range of topics and domains. This training data is designed to capture the linguistic patterns and structures of natural language, enabling the models to generate coherent and contextually appropriate responses to a wide range of queries. However, domain-specific queries, like those related to wireless communication specifications, often require relevant training data to capture the technical jargon and specialized patterns that are unique to the given domain. However, such training data related to wireless communication specifications is not always readily available. For example, 3GPP Release 16 consists of thousands of technical specifications spread across tens of compressed zip folders stored on an FTP site. This makes it challenging for LLMs to identify the relevant patterns and generate contextually appropriate responses. As a result, the responses generated by these models may be incomplete or irrelevant.

The dataset used in this study was collected from 3GPP Release 15, Release 16, Release 17 and the latest (as of this disclosure) O-RAN specifications. The specifications are downloaded from 3GPP FTP servers and from the O-RAN specifications site. The dataset can be extended to other specifications as well. The text from the specifications is extracted using docx2text (a python-based utility), antiword (a program for displaying legacy Microsoft Word documents) and PyPDF2 (a python-based utility) tools. The text samples are processed by removing figures, captions, code snippets, citations, and references, as well as performing standard NLP pre-processing such as removing extra whitespace and certain unicode characters.

The extracted text can optionally be used to create training samples for fine-tuning the base large language model. However, this disclosure contends that relying solely on fine-tuning would be inadequate for the intended application. While fine-tuning may facilitate content generation containing patterns pertinent to wireless communication specifications, the resultant responses may nevertheless be erroneous or incomplete. This phenomenon is acknowledged to be common even with the base LLMs. Consequently, it is imperative to provide citations to the technical specifications and the data sources along with the response provided to the user. This can help ensure transparency and accountability in the use of the information synthesis tool. By citing the source of the data used to generate a response, users can better trust the information provided by the model and make informed decisions about how to use the output generated by the model.

However, fine-tuning does not provide a transparent way to track the source of the data used for training. When a model is fine-tuned, the original pre-training data is often mixed with the new training data, making it difficult to trace the source of specific responses generated by the model. The act of citing the source of information is a crucial component that cannot be guaranteed by fine-tuning alone.

A prompt engineering approach presents a promising way to provide useful citations along with the response provided to the user. Prompt engineering involves designing prompts that guide the model to generate responses that are consistent with the domain-specific text by supplementing the user query with relevant data as context. By designing prompts that explicitly reference the sources of the relevant data, the model can be guided to generate responses that include useful citations. To enable such prompts, the text extracted from each of the specification documents is appended with metadata with 'source' assigned to the identifier of the technical specification document. More details on the prompt design are discussed below.

The large language models have strict limitations on the input size creating a challenge for feeding in multiple relevant technical specification documents or even a single specification document as supplemental context to the user query. For example, text-davinci-003 model can only take an input of approximately 4097 tokens, which translates to approximately 3000 words, a threshold that is crossed by many specification documents that run into tens and hundreds of pages. Hence, it is necessary to segment the document into smaller chunks of reasonable size, that can be fed to the model as supplemental context.

Segmenting domain-specific context into smaller chunks presents two challenges. The main challenge is ensuring that the context is segmented in a way that maintains its coherence and preserves its meaning. It is important to ensure that the chunks are not arbitrary and do not introduce confusion or ambiguity. This requires careful consideration of the structure and content of the domain-specific text and an understanding of how the language model processes and integrates information.

Another challenge is ensuring that the smaller chunks are representative of the domain-specific context as a whole. In some cases, important information may be lost when the context is segmented into smaller chunks. It is important to ensure that the segments are chosen in a way that preserves the salient features of the context and captures the key aspects that are relevant to the user's query.

To address these challenges, each of the documents is split along section boundaries using docx2txt library tools. Within each section, the text is recursively split into samples that are approximately 4000 characters in length with an overlap of approximately 1000 samples from adjacent text samples. The text within each section is not split with a hard constraint of each split sample containing exactly 4000 characters. The text within a section is split in such a way that each sample consists of multiple complete paragraphs. In other words, the sample does not end in the middle of a paragraph. Similarly, the overlap from adjacent samples always consists of full sentences. Such a split, respecting section, paragraph, and sentence boundaries, with a reasonable length for each sample, ensures that the following desired goals of chunks—(1) being coherent and not arbitrary, and (2) being representative of the domain-specific context as a whole—are met. Further, each of the text sample's metadata is refined such that the 'source' variable is assigned a string comprising the identifier of the technical specification and the section title. This provides additional context and helps to ensure that the resulting data is properly attributed to the correct source.

As discussed above, the text needs to be tokenized and converted to word embedding vectors for the consumption by LLMs. OpenAI embedding model openai-textembedding-ada-002 is used to transform each of the text samples into word embedding vectors. The resulting vector representation for each sample is stored in an index for efficient querying. The resulting domain-specific database of domain-specific word embedding vectors consists of 86 million tokens.

The prompt engineering approach involves augmenting the user's query with relevant text from a database before feeding it to the large language model. This approach allows for the system to account for updates or modifications in the database. On the other hand, fine-tuning requires a reasonable number (e.g., a couple hundred) of new training samples to be effective. This limits how frequently the model can be fine-tuned to accommodate the updates in the database. Furthermore, the prompt engineering approach also safeguards the system from generating non sequitur responses as the approach grounds the response in accordance with the relevant text from the database.

When the user inputs a query into the present conversational AI system, the query is pre-processed, tokenized, and transformed into a word embedding vector, using methods similar to those described above. The query vector is then compared to each of the word embedding vectors in the domain-specific database to identify the samples in the database that are closest to the query semantically.

To match the user query to relevant samples in the database, a similarity metric is used. The most common similarity metric used in natural language processing (NLP) is cosine similarity. Cosine similarity measures the angle between two vectors in a high dimensional space. If two vectors are very similar, their cosine similarity will be close to 1. If they are very different, their cosine similarity will be close to 0. Other similarity metrics have been evaluated, as discussed below.

Using the similarity metric, the NLP model can rank the samples in the database according to their similarity to the user query. The most similar samples are then used to create a prompt. The main challenge is efficient retrieval of relevant vectors from the database. FAISS (Facebook AI Similarity Search) library is used to efficiently compute the similarity between the query vector and all the stored vectors.

One could directly append the most similar vectors in the database, referred to as 'context', with the user query, and feed the foundation LLM with the resulting prompt. However, the prompt engineering approach in combination with few-shot learning has shown promising results in several natural language processing tasks. Few-shot learning is a type of machine learning that enables models to learn from a small set of examples, making it an ideal technique for prompt engineering. The model learns to recognize patterns in the examples and applies that knowledge to new inputs.

The present conversational AI system incorporates few-shot learning techniques by creating a prompt template with few pre-defined example queries, relevant context obtained from specifications and reference responses. A prompt is then generated, following the template illustrated in Table 2, with the {query} variable assigned to the new user query and the {context} variable assigned to the top-ranked samples in the database according to the similarity metric with the user query. The LangChain library is used to create the prompt according to the template and the OpenAI text-davinci-003 model is used as the foundation LLM.

TABLE 2

Prompt template

Please produce a response that includes references ("SOURCES") using the provided extracted sections of a lengthy document and a question.
QUESTION: what is PDCP
=========
Content: PDCP provides its services to the NAS at the UE or the relay at the Radio Network Controller (RNC). The Packet Data Convergence Protocol shall perform the following functions: - header compression and decompression of IP data streams (e.g .. TCP/IP and RTP/UDP/IP headers for IPv4 and IPv6) at the transmitting and receiving entity, respectively - transfer or user data. This function is used for conveyance of data between users of PDCP services. - maintenance of PDCP sequence numbers for radio bearers that are configured to support lossless SRNS Relocation or lossless DL RLC PDU size change. Source: 3GPP TS 25.323
=========
PDCP (Packet Data Convergence Protocol) is a protocol used in 3GPP networks to provide data transfer services between the UE and the network. It is responsible for adding/removing a small header to each packet and sending/receiving it from/to RLC. It also provides functions such as byte alignment, user plane data, control plane data, and MAC-1. 3GPP TS 25.323. "Packet Data Convergence Protocol (PDCP) specification"
QUESTION: (query)
=========
(context)
=========
FINAL ANSWER:

The present conversational AI system incorporates history by observing that information synthesis of wireless communication specifications is inherently an iterative process where the responses lead to subsequent questions that depend on the preceding responses. Incorporating previous queries and responses in LLMs can enable such a chain of questioning, where a language model can use the context of previous interactions to generate more informed and relevant responses. It also enables LLMs to maintain context and continuity in conversations and provide a more natural and intuitive interaction.

The history is incorporated into the prompt by appending the previous query, referred to by the variable {previousquery}, and the previous response, referred to by the variable {previousresponse}, in the following format illustrated in Table 3 just before the 'QUESTION: {query}' in the original prompt in Table 2. As more and more history gets accumulated, the prompt size could eventually exceed the input size of the foundation LLM, at which point the oldest query-response pairs are removed from the prompt until the prompt size is within the limits of input size.

TABLE 3

Prompt template for incorporating history

QUESTION: (previousquery)
=========
=========
FINAL ANSWER: (previousresponse)

Expert data contributions and feedback play a crucial role in improving the domain-specific responses generated by the present conversational AI system due to the following reasons: 1) Ambiguous and under-specified protocols: Technical specifications are prone to contain ambiguous and under-specified sentences. These phenomena and the resulting implications of buggy implementations and security vulnerabilities are known. Expert data would help resolve the ambiguities. 2) Missing context: It is not always possible to include all the relevant information or context as the prompt engineering considers samples in the database that are in the top few, ranked according to the similarity metric. Expert feedback helps address this issue by providing additional context and knowledge that the model may have missed. 3) Coherence and naturalness of the responses: LLMs are designed to generate text that mimics human language. However, despite filtering, vast swaths of specification documents contain incoherent information when viewed as text. Expert feedback can help identify such issues and guide the model to generate more appropriate responses.

LLMs rely on large amounts of data to learn patterns and generate responses. Therefore, high-quality data contributions from experts in the domain of interest can significantly improve the performance of the model. Hence, the present conversational AI system includes mechanisms for incorporating expert feedback and data contributions. Upon receiving a response, the user can optionally like/dislike to provide feedback on the relevance of the response. Additionally, the user can also request expert assistance by clicking a designated button, which will create a corresponding issue in a GitHub repository. This issue will contain the query, context, and response, and can be resolved through contributions from domain experts. At present, only a select few pre-identified experts are capable of resolving these issues. The expert data obtained through this process is then added to the domain-specific database and attributed to the relevant expert as its source.

The creation of an issue in a GitHub repository ensures that the query, context, and response are stored in a central location and can be easily accessed by experts. The participation of domain experts in resolving issues ensures that the system's responses are accurate and reliable. Further, since the response and context are also posted along with the query, the expert may need to add only the information related to incomplete and incorrect portions, rather than writing an entire article answering the user query. This is in contrast to previous approaches that attempted to ease the accessibility of specification information by collaborative contributions of entire articles from experts explaining different concepts and procedures.

The attribution of responses to the expert authors ensures that experts receive recognition for their contributions, which is essential for encouraging continued participation and also creates accountability to the information that is being added to the domain-specific database. While limiting the number of experts may create a bottleneck (leading to delays in resolving the issues) the system leaves the possibility to expand the pool of experts or adopting a voting mechanism, similar to Stack Overflow, as part of future work.

As described above, the present conversational AI system is built on OpenAI's textdavinci-003 foundation LLM using docx2txt, antiword and PhPDF2 tools for data extraction, FAISS library for computing similarity between the query vector and all the sorted vectors in the database, and LangChain library for prompt generation. The system has been confidentially released as an application service for a limited set of 18 researchers and domain experts working in the domain of wireless communication systems.

To evaluate the performance of different LLM-based conversational AI tools for information synthesis of wireless communication specifications, a benchmark dataset of 150 expert queries and reference responses has been created. It is believed that no such dataset is publicly available. The reference queries have been inspired by the queries posted to the AI tools by the users and internal feature specification documents used for virtual 5G core development that is commercially available. The queries cover a wide range of topics including, for example, waveform generation, procedure call flows, and authentication.

The reference responses were hand-crafted by synthesizing the required information from the relevant specifications, research papers, and books that the experts are familiar with. The experts were given guidelines to answer in natural human language without losing technical details, to verify their answers against technical specifications, and to limit the size of the answers to less than 500 words. The expansion of the dataset with more reference queries and expert data is part of future work.

An end-to-end evaluation is performed in which the accuracy and relevance of responses generated by the present conversational AI system are first evaluated against the benchmark dataset described above. Following the evaluation, the sensitivity analysis is performed for different components incorporated into the present conversational AI system.

ChatGPT is an illustrative representative example of a state-of-the-art conversational AI tool for information synthesis. Both ChatGPT and the present conversational AI system are probed with the same set of test queries selected from the benchmark dataset. The temperature of the ChatGPT and the foundation LLM used by the present system was set to 0 and their maximum output token size was set to 256.

To measure the performance of the respective legacy and new systems, the responses are compared against those in the benchmark dataset using standard BLEU scores. The advantages and limitations of BLEU scores compared with other automated evaluation metrics for comparing the accuracy and relevance of responses are well-known.

Both ChatGPT and the present conversational AI system have been evaluated against all the queries in the benchmark dataset. The responses from the present conversational AI system achieved a better average BLEU score of 0.28 compared to 0.03 obtained for ChatGPT's responses.

On closer inspection, the evaluation finds that ChatGPT, many times (similar to the scenario illustrated in FIG. 1) generates text that is grammatically correct but semantically incorrect. The present conversational AI system cites a source along with the response in most of the cases. This is because of the similarity search mechanism incorporated into the context extractor component and source metadata incorporated into samples in the domain-specific database.

We also observe that, in a few cases, even though the response of the present conversational AI system is sensible, it still results in a poor BLEU score. For example, for a query on PTRS, the present conversational AI system's response—"PTRS (Phase Tracking Reference Signal) is a signal used in 5G/NR for tracking the phase of the local oscillator at the receiver and transmitter. It is used to suppress phase noise and common phase error, particularly important at high carrier frequencies such as millimeter wave. PTRS can be present both in the downlink (associated with PDSCH) and in the uplink (associated with PUSCH). The time and frequency densities of PTRS are adapted to signal-to-noise-ratio (SNR) and scheduling bandwidth. Additionally, a PRS-only TP is a TP which only transmits PRS, DL-PRS signals and is not associated with a cell"—and the reference response-"The phase noise of a transmitter increases as the frequency of operation increases. The PTRS plays a crucial role especially at mmWave frequencies to minimize the effect of the oscillator phase noise on system performance.

One of the main problems that phase noise introduces into an OFDM signal appears as a common phase rotation of all the sub-carriers, known as common phase error (CPE). PTRS stands for Phase Tracking Reference signal. Its main function is to track phase of the Local Oscillator at transmitter and receiver. PTRS enables suppression of phase noise and common phase error specially at higher mmwave frequencies. It is present both in uplink (in NR-PUSCH) and downlink (in NR-PDSCH) channels", which are both useful. However, the BLEU score of the response is very low. This is a known limitation from automated evaluation metrics like BLEU.

The impact of modifying different components of the present conversational AI system is evaluated next.

1) LLMs: The present disclosure considers four different models for foundation LLM described in the present conversational AI system's architecture: davinci, curie, babbage, and fine-tuned davinci models. Table 4 illustrates the results obtained by using different LLMs as the base or fine-tuned foundation LLM in the architecture shown in FIG. 3. Using the text-davinci-003 model as the LLM yields a 0.28 BLEU score. However, using a less capable LLM like text-curie-001 significantly degrades the accuracy to 0.02, which is below what ChatGPT without any prompt engineering can achieve. Using an even lesser-capable model like text-babbage-001 degrades the BLEU score to near zero. However, using a fine-tuned text-davinci-003 improves the BLEU score to 0.36. To fine-tune the text-davinci-003 model, Adam optimizer with $\epsilon=10^{-8}$ was used with a learning rate of $5\times10^{-5}$. The training data consisted of the text samples in the domain-specific database modified to fit the format required by OpenAI fine-tuning API. 10% of the training samples were used as validation data.

TABLE 4

| Sensitivity analysis: LLMs | |
| --- | --- |
| LLM | BLEU score |
| text-davinci-003 | 0.28 |
| text-curie-001 | 0.02 |
| text-babbage-001 | 0 |
| fine-tuned text-davinci-003 | 0.36 |
| fine-tuned text-davinci-003 alone | 0.25 |

Table 4 also lists the BLEU score obtained by the fine-tuned davinci model without any prompt engineering. It achieves an inferior BLEU score of 0.25. This quantifies the benefit of the prompt engineering approach. Further, prompt engineering allows citing the information source, a capability which a fine-tuning-only approach cannot provide.

2) Similarity metrics: Three different similarity metrics are considered: cosine similarity, L2 distances and L1 distances. The text-davinci-003 model is used as LLM. The BLEU scores obtained for the three choices of cosine, L2, and L1 similarity metrics are 0.28, 0.27, and 0.25 respectively. This indicates that cosine and L2 similarity metrics provide almost identical performance in retrieving the relevant text from the database.

3) Maximum output token size. The maximum output token size is varied amongst the values of 100, 256, and 512 tokens and the observed BLEU scores are respectively 0.2, 0.28, and 0.28. For output token sizes beyond 256, the BLEU score is not affected. However, smaller token sizes adversely affect the BLEU score due to the response remaining unfinished due to limits on the output token size.

4) Inference cost. The average cost of each user query is 0.1 cents as the query is appended with the context information. However, the inference cost is expected to reduce in the future with the advancements in foundation LLMs and inference techniques.

Considerations are provided for responsible use of the present conversational AI system. At the start of each session, the system explicitly states that 'we do not recommend fully automated systems based solely on the outputs' and that 'it is important that humans are still in the loop to correct any mistakes that the system may make'. Furthermore, the answers generated by the system will be cited with specifications and there are mechanisms in place for experts to contribute data and feedback in an accountable manner. All the data used in this paper is in public domain and is not subject to copyright issues. However, the system may inherit any biases inherent to the text generated from the underlying foundation LLM. For the benchmark dataset creation, guidelines were taken into consideration to be gender-neutral when possible.

In conclusion, the present disclosure describes a novel application of foundation models for information synthesis of wireless communication specifications. Disclosed is a conversational AI system which features a question-and-answer interface with advanced capabilities for providing accurate and relevant responses related to wireless communication specifications. As shown in FIG. 3, the system 300 incorporates three essential elements, including a domain-specific database 305, a context extractor 310, and a feedback mechanism 315. The system incorporates mechanisms to overcome the limitations of foundation LLMs' input size, for citing information sources, and for allowing expert data contributions. The system demonstrates a better BLEU score of 0.28 on a benchmark dataset compared to 0.03 achieved by ChatGPT.

Information about 5G wireless networks is now presented to provide background and context for the inventive concepts discussed herein. 5G mobile networks utilize a service-based architecture that supports data connectivity and services enabling deployments using techniques such as, for example, Network Function Virtualization (NFV), Software Defined Networking (SDN), and cloud computing. Some exemplary features and concepts of 5G networking include separating User Plane (UP) functions from Control Plane (CP) functions allowing independent scalability, evolution, and flexible deployment across, for example, centralized locations and/or distributed (i.e., remote) locations. The functional design of 5G networks is modularized to enable flexible and efficient provisioning of features such as network slicing. Dependencies are also minimized between the Radio Access Network (RAN) and the Core Network (CN). The 5G architecture is thus defined with a converged core network with a common AN-CN interface which integrates different Access Types, for example 3GPP (3rd Generation Partnership Project) access and untrusted non-3GPP access such as WiMAX, cdma2000®, WLAN, or fixed networks.

The International Mobile Telecommunications (IMT) recommendation for 2020 from the International Telecommunication Union Radiocommunication Sector (ITU-R M.2083-0) envisions usage scenarios for 5G networks that include: Mobile Broadband (MBB), as indicated by reference numeral 405; Ultra-Reliable and Low Latency Communications (URLLC) 410; and Massive Machine Type Communications (MMTC) 415, as shown in the usage scenario examples 400 in FIG. 4.

The MBB usage scenario 405 addresses the human-centric use cases for access to multi-media content, services, and data. The demand for mobile broadband will continue to increase, leading to enhanced Mobile Broadband. The enhanced MBB usage scenario will come with new application areas and requirements in addition to existing MBB applications for improved performance and an increasingly seamless user experience. The enhanced MBB usage scenario may cover a range of cases, including wide-area coverage and hotspot, which have different requirements.

For the hotspot case (i.e., for an area with high user density), very high traffic capacity is needed, while the requirement for mobility is typically low and user data rate is higher than that of wide-area coverage. For the wide area coverage case, seamless coverage and medium to high mobility are desired, with much improved user data rate—20 Gbps for download and 10 Gbps for upload—compared to existing data rates. However, the data rate requirement may be relaxed compared to hotspot.

The URLLC usage scenario 410 may typically have relatively stringent requirements for capabilities such as latency and availability. For example, latency in the RAN may be expected to be less than 1 ms with high reliability. Some examples include wireless control of industrial manufacturing or production processes, remote medical surgery, distribution automation in a smart grid, transportation safety, etc.

The MMTC usage scenario 415 may be characterized by a very large number of connected devices such as Internet of Things (IoT) devices with hundreds of thousands of connected devices per square kilometer. MMTC may also be referred to as "Massive IoT" (MIOT) in some 5G literature. Such connected devices can be expected to transmit a relatively low volume of non-delay sensitive data. Devices are typically required to be low cost and have a very long battery life.

Figure 4:
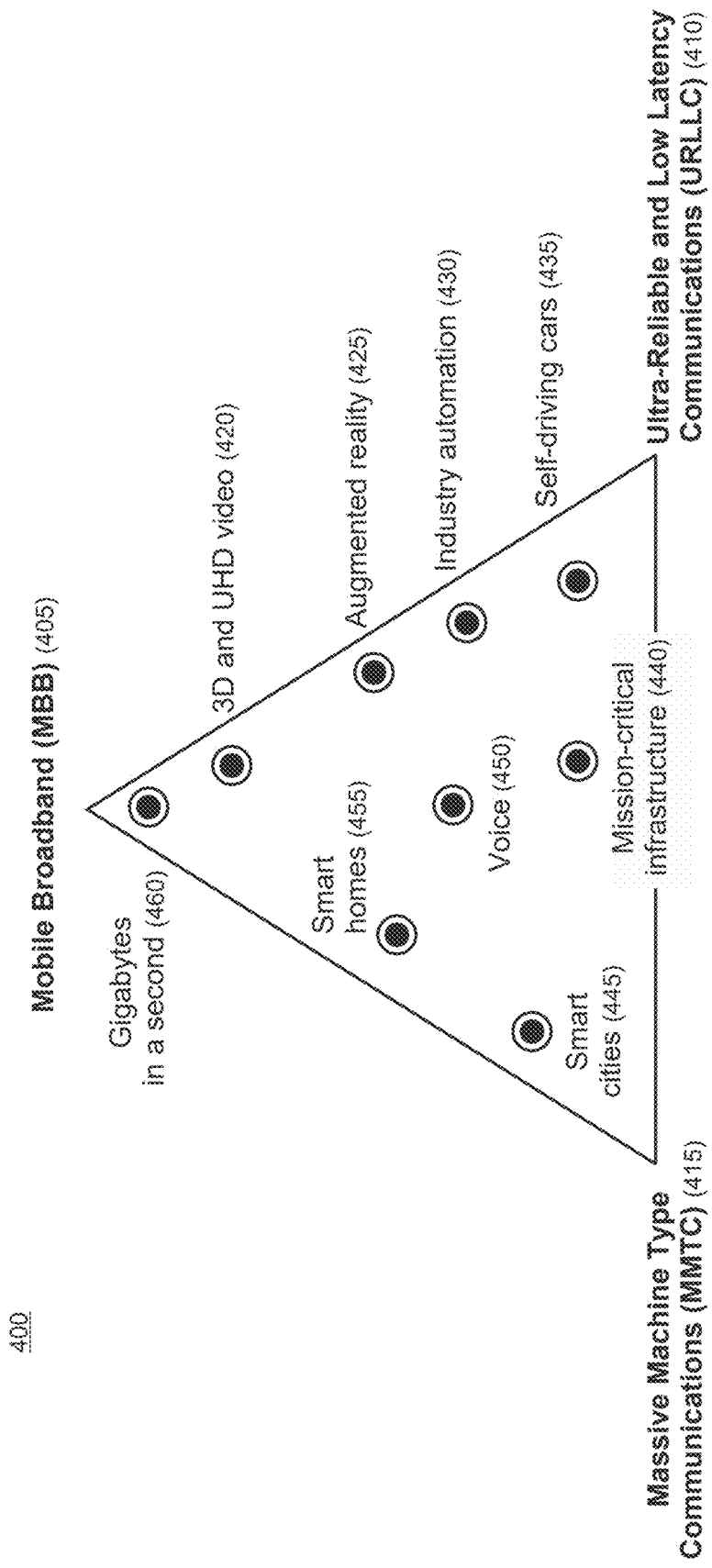
FIG. 4 shows illustrative 5G network usage scenario footprint examples.

Illustrative applications for 5G networking are also shown in FIG. 4. The applications can fall within the usage scenario examples 400 at different locations depending on a given balance of application networking requirements. As shown, the illustrative applications can include three-dimensional and/or ultra-high-definition (3D and UHD) 420; augmented reality 425; industry automation 430; self-driving cars 435; mission-critical infrastructure 440; smart cities 445; voice 450; smart homes 455; and gigabytes in a second 460.

It is emphasized that the ITU expects additional 5G usage scenarios and applications to emerge, and 5G network operators may not necessarily be limited to or required to support any particular usage scenarios or predefined slice types. Similarly, application and service providers may be expected to leverage the higher speeds and lower latency of 5G to develop feature-rich capabilities for all kinds of connected devices (both fixed and mobile), deliver compelling user experiences across a range of computing devices and platforms, and further realize the potential of artificial intelligence (AI) and IoT in a way that current connectivity prohibits.

With 5G, mobile networks can be optimized as features such as network slicing become available for both operators and enterprises deploying 5G infrastructure. A network slice is a logical (i.e., virtual) network customized to serve a defined purpose, type/class of service, quality of services (QoS), or dedicated customers. A 5G network slice may be dynamically created consisting of an end-to-end composition of all the varied network resources and infrastructure needed to satisfy the specific performance requirements of a particular service class or application that may meet some predefined service level agreement (SLA). Each portion of the 5G network is respectively sliced such that the network can be viewed as being composed of air interface slices, RAN slices, mobile core slices, cloud slices, etc. 5G network slicing thus enables creation of multiple logical and secure networks that are isolated from each other, but which span over the same common physical network infrastructure.

5G network slices may consist of resources composed into an end-to-end service delivery construct. These may include physical resources, either a share or profile allocated to a slice, or dedicated physical resources in some cases. Slices also consist of logical entities such as configured network functions, management functions, VPNs (virtual private networks), etc. Resources (physical or logical) can be dedicated to a 5G network slice, i.e., separate instances, or they may be shared across multiple slices. These resources are not necessarily all produced within the mobile network provider as some may comprise services consumed from other providers, facilitating, for example, aggregation, cloud infrastructure, roaming, etc.

Figure 5:
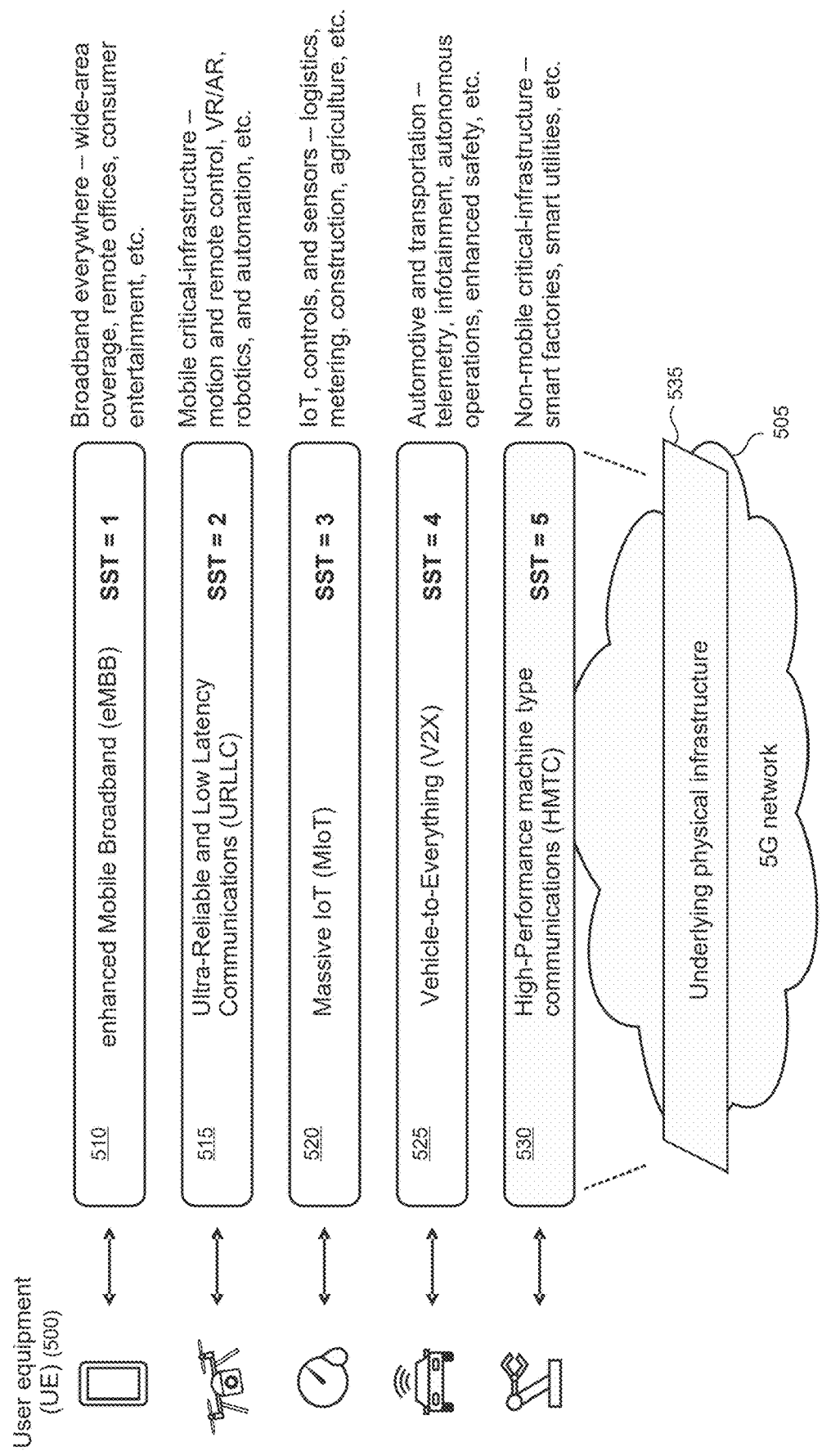
FIG. 5 shows illustrative standardized 5G network slices.

3GPP is the principal standards organization engaged in the architecture development for 5G. Several iterations of standards releases have established a foundation for the current phase of slice-specific definition. The 3GPP R15 System Architecture (3GPP TS 23.501) currently defines standard service-based Slice/Service types (SST). As shown in FIG. 5, the standardized 3GPP network slices of a 5G network 505 include eMBB (enhanced Mobile Broadband) (SST=1), URLLC (SST=2), and MIoT (SST=3) which correspond to the usage scenarios described by ITU-R 2083-0. 3GPP also defines additional standardized SST values for V2X (Vehicle-to-Everything) (SST=4) and HMTC (High-Performance Machine Type Communications) (SST=5). It may be appreciated that slice service types beyond those having standardized SST values can be defined.

The five standardized service types for 5G network slices are respectively indicated by reference numerals 510, 515, 520, 525, and 530 in FIG. 5. IMT-2020 describes the concept of network slicing as supporting a wide variety of requirements in UE and application services using a network where multiple logical network instances tailored to the requirements can be created. Network slicing allows the 5G network operator to provide dedicated logical networks (i.e., network slices) with customer-specific functionality. The 5G architecture enables different network configurations in different network slices.

A network slice can be dedicated to different types of services and span all the domains of the underlying physical infrastructure 535, such as the transport network supporting flexible locations of functions, dedicated radio configurations or specific radio access technologies (RATs), and the mobile core network. Network slices can also be deployed across multiple operators. Slices can share common physical infrastructure or may have dedicated resources and/or functions in some cases. Different types of network slices can be composed of not only standardized network functions but also some proprietary functions that may be provided by different operators or third parties.

Standardized SST values provide a way for establishing global interoperability for 5G network slicing so that operators can efficiently support key industry verticals—for example, industrial automation, healthcare, entertainment, transportation, manufacturing, energy, agriculture, construction, security, etc.—for the most commonly used Slice/Service Types. Additional customization and/or specialization for applications and services may be implemented for specific usage scenarios. User equipment (UE) may provide Network Slice Selection Assistance Information (NSSAI) parameters to the network to help it select a RAN and a core network part of a slice instance for the device. A single NSSAI may lead to the selection of several slices. NSSAI consists of Session Management NSSAIs (SM-NSSAI), which each include an SST and possibly a Slice Differentiator (SD). SST may refer to an expected network behavior in terms of features, e.g., broadband or IoT, while the SD can help in the selection among several slice instances of the same type. It is noted that services supported in a standardized slice may also be supported by other slices having other (i.e., non-standard) SST values.

FIG. 5 shows UE 500 that may be representative of the wide variety of device types that may utilize 5G networking, including, for example and not by way of limitation, smartphones and computing devices, drones, robots, process automation equipment, sensors, control devices, vehicles, transportation equipment, tactile interaction equipment, virtual and augmented reality (VR and AR) devices, industrial machines, and the like. The standardized slices can be respectively mapped to such UE types in typical usage scenarios to optimize network utilization and user experiences, but 5G network slicing is designed for flexibility to meet demand across a wide spectrum of device types and diverse applications and services. The network softwarization provided by SDN and NFV paradigms in 5G enables network slice configuration—i.e., how various physical infrastructure and network resources are deployed—to be rapidly and dynamically adapted to ensure that performance objectives are continuously met for 5G applications across a given population of UEs.

As shown, the configuration of eMBB slice 510 may be optimized for broadband-everywhere usage scenarios across a wide coverage area for applications such as consumer entertainment (e.g., video, gaming, streaming), remote offices, etc., where maximized network speeds and data rates are desired and high traffic volumes are typically experienced. The URLLC slice 515 may be configured for mobile critical-infrastructure low-latency usage scenarios including applications such as remote control operations in medical and industrial environments, VR and AR, robotics and automation, etc.

The MIOT slice 520 may be configured for optimal handling of IoT, control, and sensor applications relating to logistics, construction, and metering in vertical industries such as construction and agriculture. The V2X slice 525 may be optimized for automotive and transportation applications such as telemetry, infotainment, autonomous operations, enhanced safety, and the like. The HMTC slice 530 is typically configured for optimal handling of non-mobile/fixed critical-infrastructure applications such as smart factories, smart utilities, etc.

Figure 6:
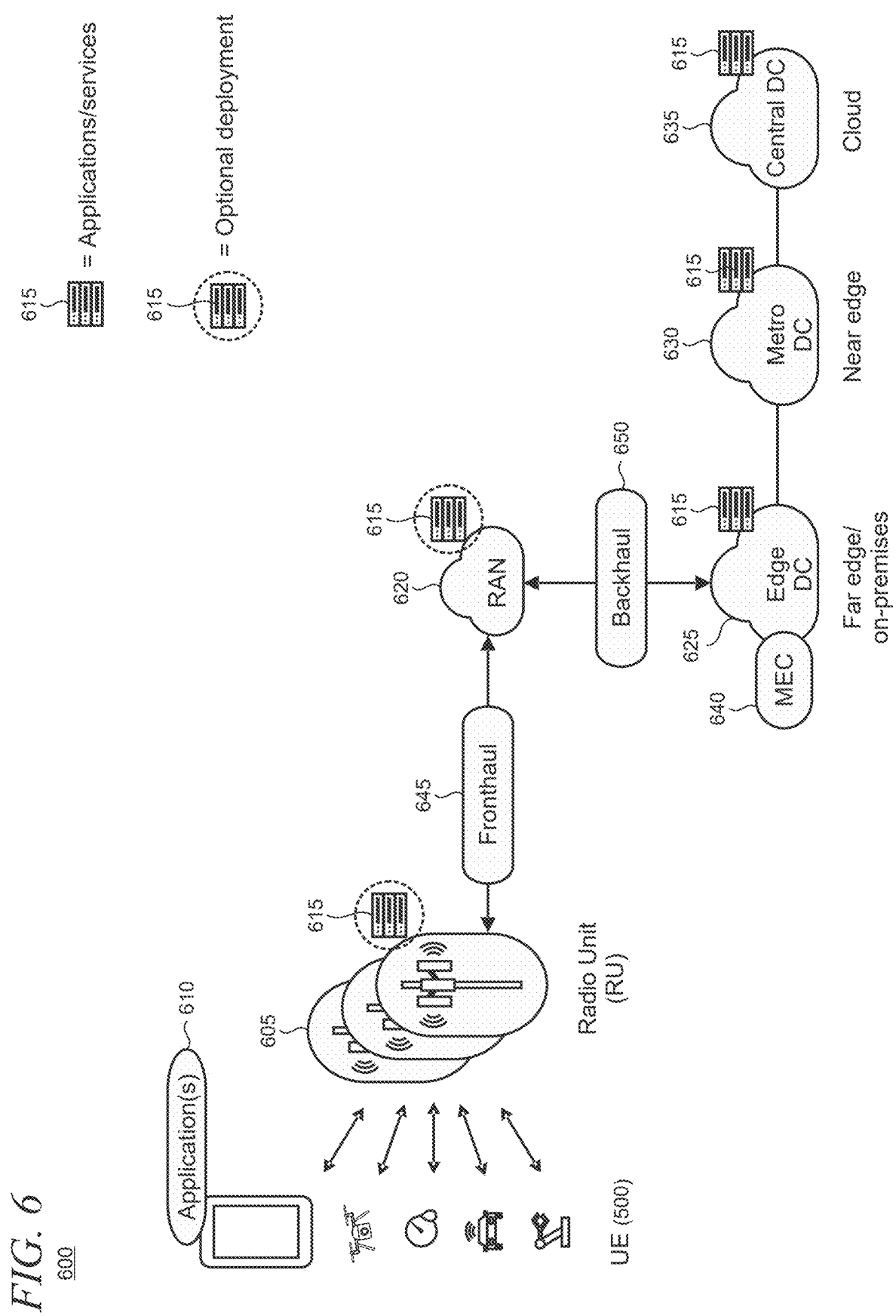
FIG. 6 shows illustrative physical infrastructure in a 5G network architecture.

FIG. 6 shows illustrative physical infrastructure in a 5G network architecture 600. Multiple instances of a radio unit (RU) 605 are configured to interact with a diverse population of UE 500. Each UE typically includes one or more local applications 610 or client-side software/firmware component that is arranged to interface with one or more remote application servers, service providers, or other resources (collectively indicated by reference numeral 615) and thus require network connectivity to such remote facilities.

The RUs are coupled by a mobile fronthaul 645 to a RAN 620. The RAN is coupled by a mobile backhaul 650 to one or more datacenters (DCs). In this illustrative example, the DCs comprise an edge DC 625, a metro DC 630, and a central DC 635. In some 5G networking literature, the edge DC may be referred to as a far edge or on-premises DC. The metro DC may be referred to as a near edge DC, and the central DC may be referred to as the cloud. In some implementations, the edge DC may support multi-access edge computing (MEC) functions 640. In an illustrative example, the present conversational AI system is implemented as a MEC function in an edge DC.

The application servers 615 can be located at various points in the network architecture 600 to meet technical requirements and traffic demands. Typically, the application servers will be physically located closer to the UE 500 in cases where latency is sought to be minimized. However, an operator's application server location criteria may also consider factors such as management ease, scalability, and security, among other factors. In some implementations, an operator may optionally deploy application servers and other resources in the RAN 620 or RU 605, as indicated by the dashed circles in FIG. 6.

Figure 7:
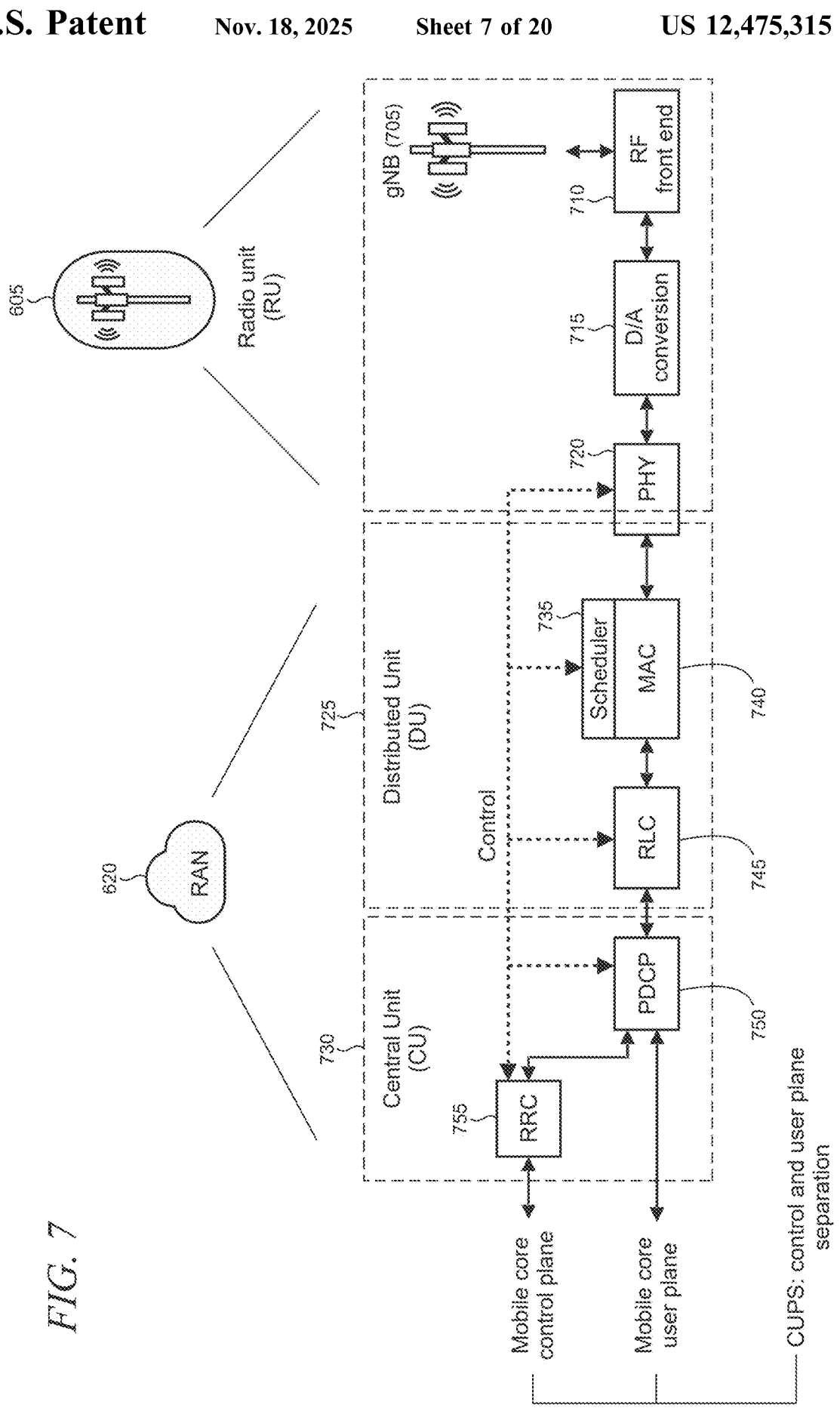
FIG. 7 shows an illustrative 5G radio access network (RAN) and radio unit (RU)

FIG. 7 shows functional blocks of the RAN 620 and RU 605. The RU comprises radio transmission points, for example, a next generation Node B, gNB 705, which handles radio communications with the UE. The gNB is serially coupled to a radio frequency (RF) front end 710, a digital to analog (D/A) conversion unit 715, and a portion of the functionality of the physical (PHY) layer 720 as described in the OSI Open Systems Interconnection model.

Under 3GPP and O-RAN (Open RAN) Alliance, the processing pipeline of the RAN 620 is split into a distributed unit (DU) 725, and a central unit (CU) 730. The DU is responsible for real-time layers 1 and 2 (L1 and L2) scheduling functions, and the CU is responsible for non-real-time, higher L2 and L3 functions. Accordingly, the DU comprises a scheduler 735 located on top of a MAC (Medium Access Control) layer component 740, an RLC (radio link control) layer component 745, and parts of a PHY (physical) layer component 720. The MAC layer component is responsible for buffering, multiplexing, and demultiplexing segments, including all real-time scheduling decisions regarding which segments are transmitted when. It is also able to make a "late" forwarding decision (i.e., to alternative carrier frequencies, including Wi-Fi, for example). The PHY layer component is responsible for coding and modulation.

The CU 730 is configured with a PDCP (Packet Data Convergence Protocol) layer component 750 and RRC (Radio Resource Control) layer component 755. The PDCP layer component is responsible for compressing and decompressing IP headers, ciphering and integrity protection, and making an "early" forwarding decision (i.e., whether to send the packet down the pipeline to the UE or forward it to another base station). The RRC layer component is responsible for configuring the coarse-grain and policy-related aspects of the RAN processing pipeline. The RRC layer component interfaces with the mobile core control plane while the PDCP layer component interfaces with the user plane to thereby implement the "CUPS" (control and user plane separation) feature of 5G.

Figure 8:
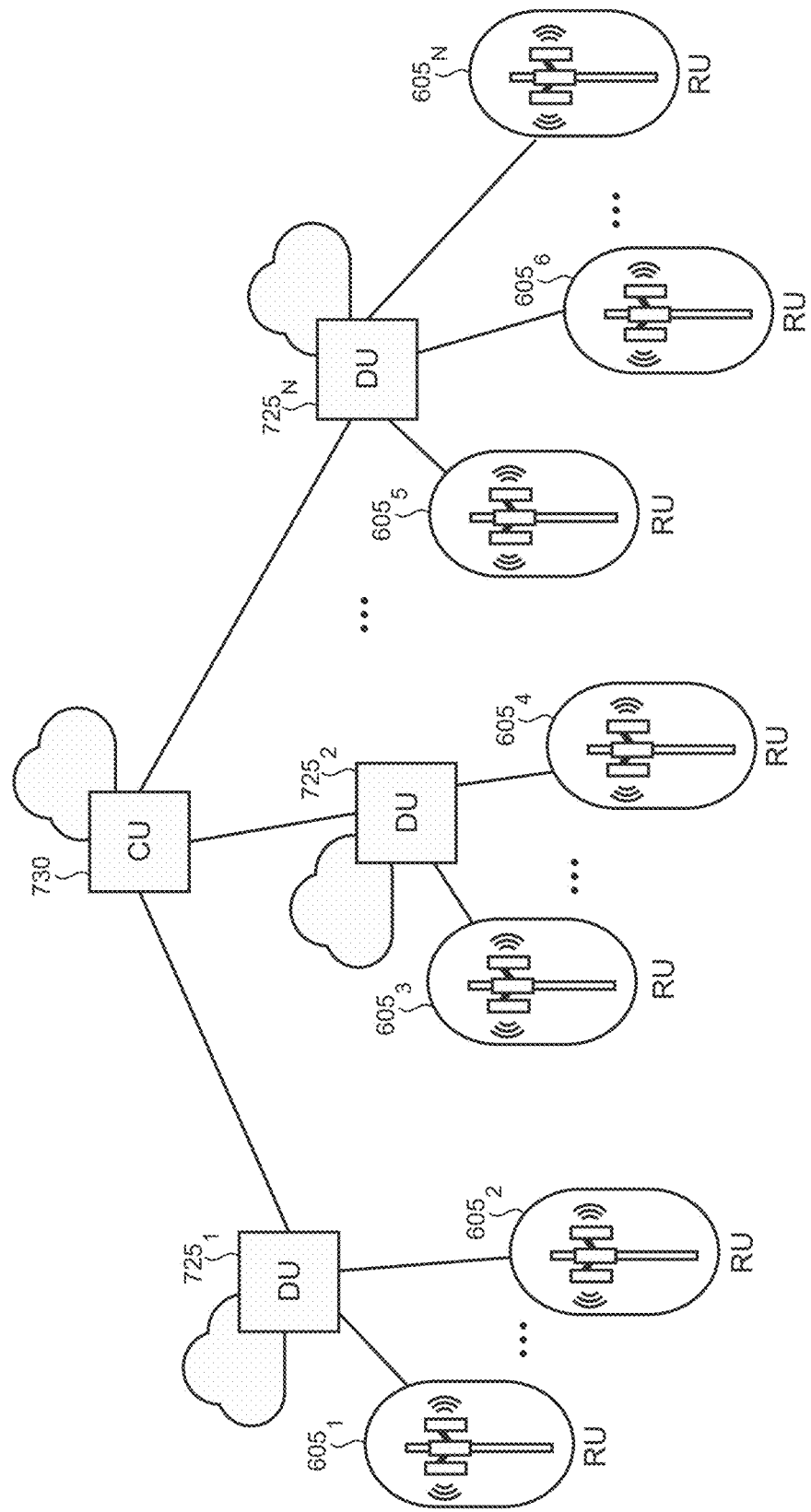
FIG. 8 shows an illustrative split-RAN hierarchy in which a central unit (CU) may support multiple distributed units (DUs) which, in turn, may support multiple RUs.

The split-RAN configuration shown in FIG. 7 enables RAN functionality to be split among physical infrastructure elements in centralized and distributed locations. For example, as shown in FIG. 8, a single CU 730 may be configured to serve multiple DUs 725, each of which in turn serves multiple RUs 605.

Figure 9:
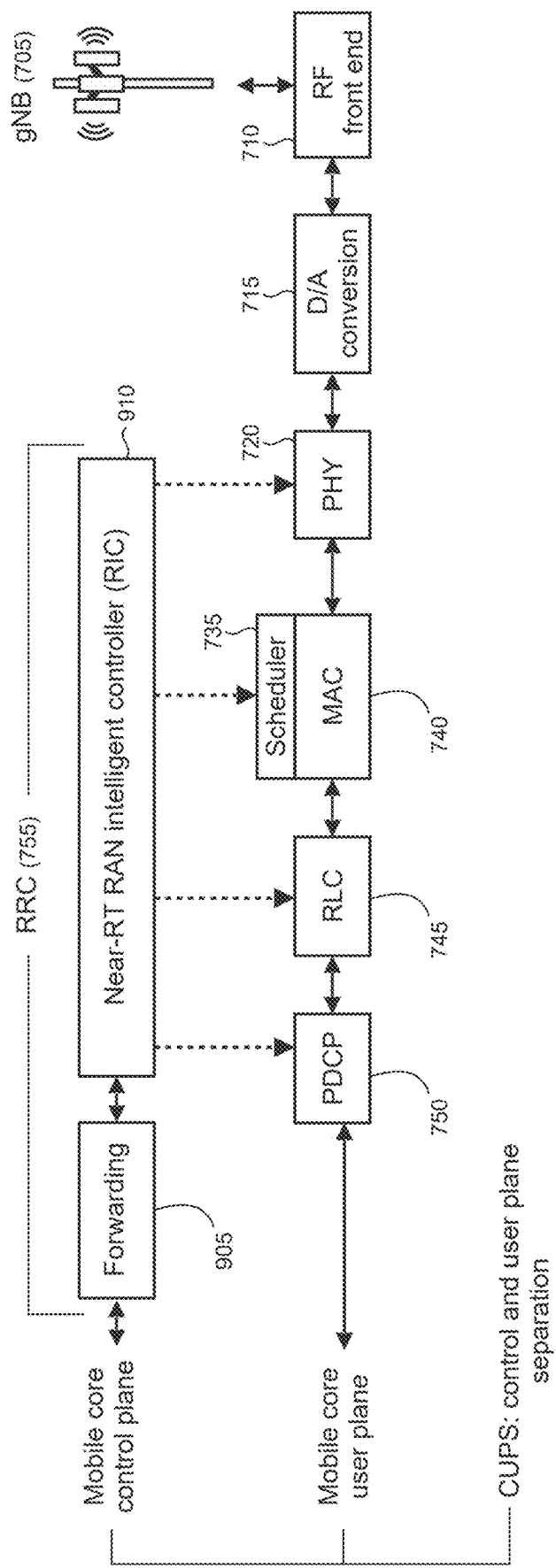
FIG. 9 shows an illustrative radio resource control (RRC) that is disaggregated into a mobile core-facing control plane component and a near-real-time RAN intelligent controller (near-RT RIC)

FIG. 9 shows that the RRC layer component 755 may be disaggregated into a mobile core-facing control plane forwarding component 905 and a near-real-time (RT) controller RAN intelligent controller (RIC) 910. The RRC layer component is thus responsible for only near-real-time configuration and control decision making, while the scheduler 735 on the MAC component 740 is responsible for real-time scheduling decisions.

Figure 10:
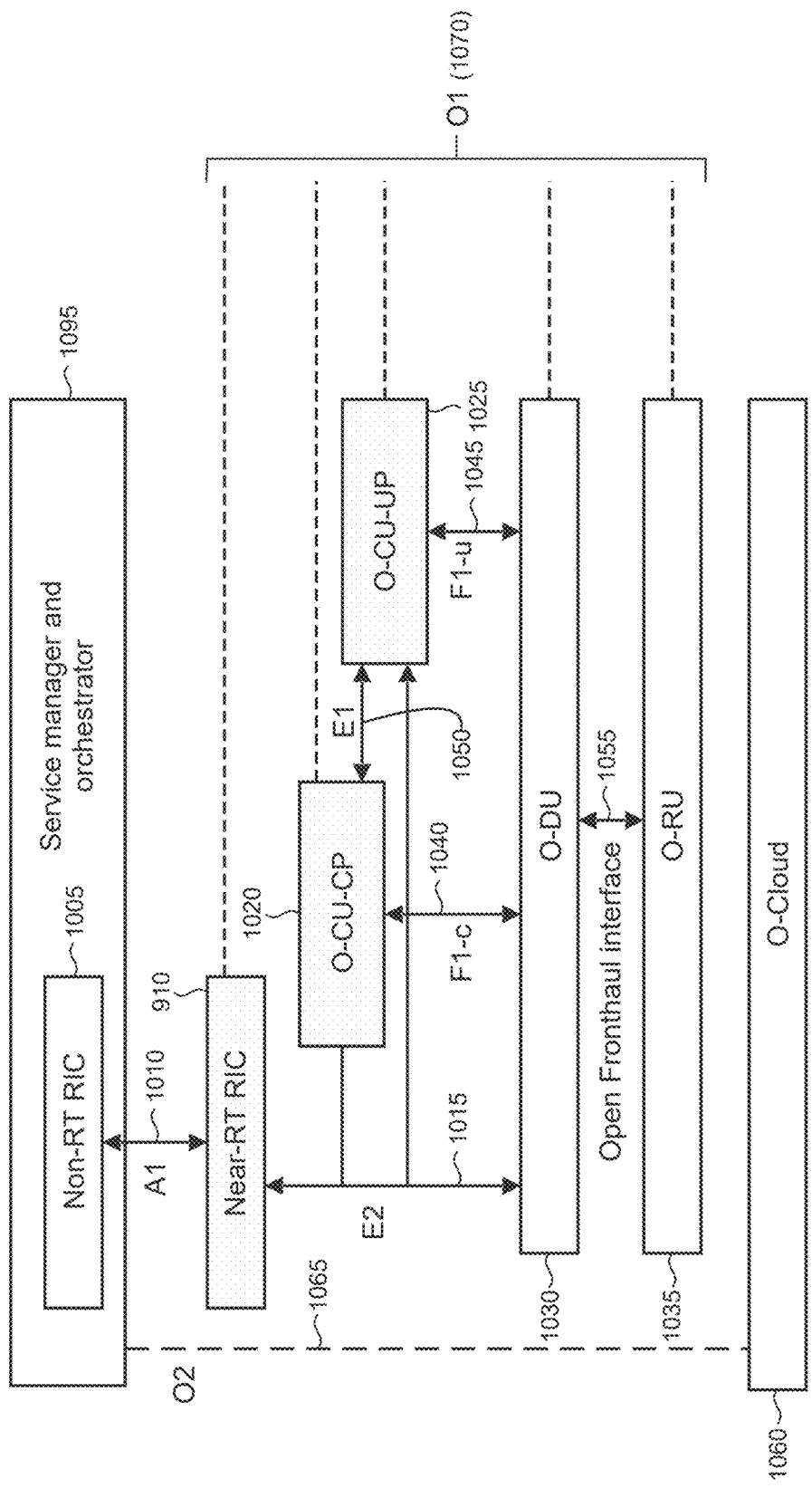
FIG. 10 shows an illustrative RAN operations and maintenance (OAM) logical architecture as described by the O-RAN (Open Radio Access Network) Alliance.

FIG. 10 shows an illustrative RAN operations and maintenance (OAM) logical architecture 1000, as described by the O-RAN Alliance. In the drawing, the "O" prefix indicates the O-RAN implementation for the functional elements of the architecture. The O-RAN Alliance defines and maintains the A1, E2, O1, O2, and Open Fronthaul interfaces discussed below. As shown, a non-RT RIC 1005 may be incorporated into a service manager and orchestrator 1095. The non-RT RIC interoperates with a near-RT RIC 910 through an A1 interface 1010.

The near-RT RIC 910 is coupled over an E2 interface 1015 with network functions for radio access control and optimization including the O-CU-CP (O-RAN Central Unit-Control Plane) 1020, O-CU-UP (O-RAN Central Unit-User Plane) 1025, and O-DU 1030. The O-CU-CP and O-CU-UP are respectively coupled to the O-DU over F1-c and F1-u interfaces, 1040 and 1045, as defined and maintained by 3GPP. The O-CU-CP is coupled to the O-CU-UP over a 3GPP E1 interface 1050. The O-DU and O-RU 1035 are coupled using an Open Fronthaul interface 1055 (also known as a lower layer split (LLS) interface).

The O-Cloud 1060 is a cloud computing platform comprising a collection of physical infrastructure nodes that meet O-RAN requirements to host the relevant O-RAN functions (i.e., near-RT RIC, O-CU-CP, O-CU-UP, and O-DU), the supporting software components (such as Operating System, Virtual Machine Monitor, Container Runtime, etc.), and the appropriate management and orchestration functions to create virtual network instances and map network functions. The O-Cloud is coupled to the service manager and orchestrator 1095 over the O2 interface 1065. An O1 interface 1070 is provided to each of the near-RT RIC. O-CU-CP, O-CU-UP, O-DU, and O-RU, as shown in FIG. 10.

Figure 11:
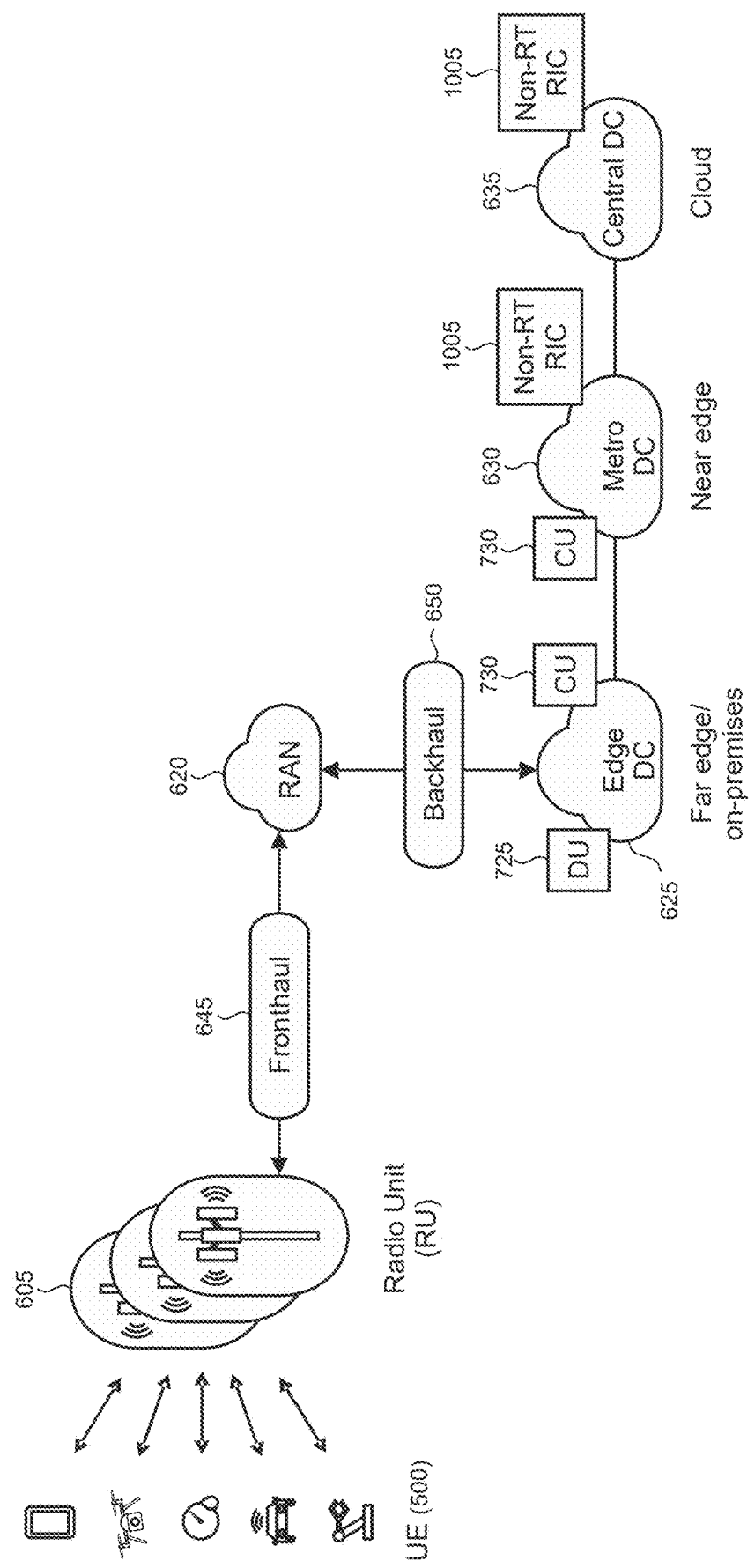
FIG. 11 shows an illustrative 5G implementation in which split-RAN functional units and instances of the non-real-time RIC (non-RT RIC) may be distributed among physical infrastructure components.

The splitting of functional elements among the DU, CU, near-RT RIC, and non-RT RIC, as discussed above, enables flexible deployment of instances of such elements in the physical infrastructure that underlies a typical 5G network. FIG. 11 shows an illustrative 5G implementation in which split-RAN functional units and instances of the non-RT RIC may be distributed among physical infrastructure components. For example, as shown, a DU 725 and CU 730 may be located at the edge DC 625. A CU 730 and non-RT RIC 1005 may be located in the metro DC 630. The central DC 635 can also host a non-RT RIC in some cases.

Figure 12:
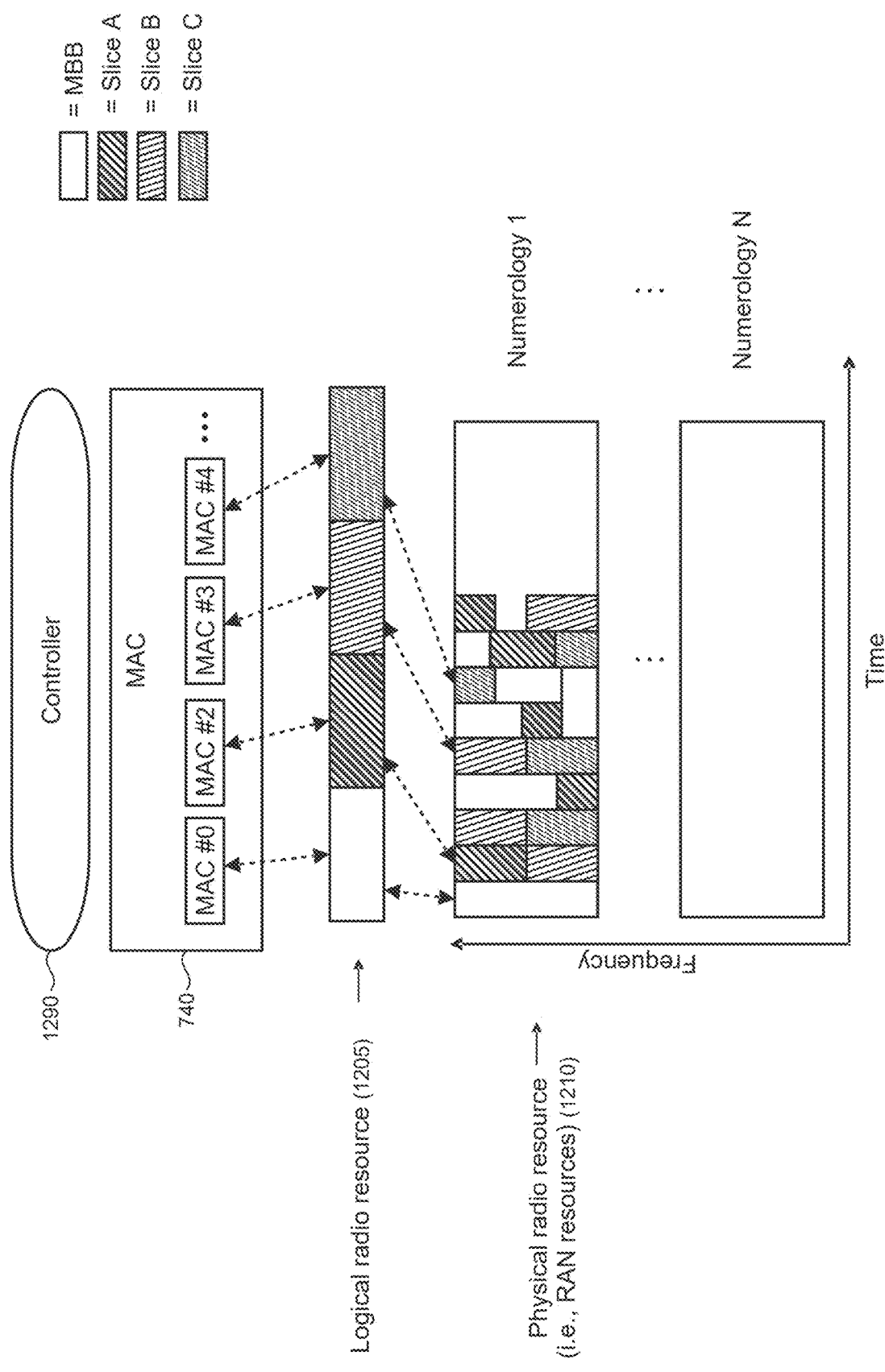
FIG. 12 shows an illustrative controller that may be configured to allocate physical radio resources among RAN slices.

FIG. 12 shows a controller 1290 as illustratively configured to allocate physical radio resources among network slices. The controller may be instantiated, for example, as a component of the near-RT RIC 910 (FIG. 9) to thereby implement or combine the functionality of the scheduler 735 (FIG. 7). In alternative implementations, part of the controller may be distributed outside the near-RT RIC, for example, in a CU in an edge or metro DC, or included in one or more other functional elements of the 5G network architecture. In some implementations, dynamically optimized RAN actions to ensure SLA guarantees may be performed in the near-RT RIC while longer term SLA assurance can be handled in the non-RT RIC.

The controller 1290 is arranged to control operations of the MAC component 740 based on logical representations 1205 of a radio resource in the PHY component 720 (FIG. 7). As shown, the MAC component 740 performs intra-slice resource allocation. More specifically, the physical radio resource 1210 is partitioned into multiple blocks or segments each defined by one numerology to meet certain communication requirements, such as low latency, wide coverage, etc. Numerology refers to the values of the basic physical transmission parameters, particularly including, for example, the transmission time slot length in which length of the slot is shorter for higher numerologies.

Each RAN portion of a network slice occupies a subset of physical resources taken from one or multiple numerology segments which may be represented, as shown in FIG. 12, using dimensions comprising frequency and time. In 5G, frame structures of the radio resources in the time domain are 10 ms in length irrespective of the numerology in use but may vary in width in the frequency domain. For example, a RAN slice serving automotive services in a high mobility scenario may use a wider subcarrier spacing to combat high Doppler shifts, while a RAN slice serving a latency-sensitive service such as real-time gaming may use fewer symbols in each sub-frame. It may be appreciated that spatial multiplexing, referred to as MIMO (multiple input, multiple output), may also be utilized to provide additional layers of RAN resources that the controller may allocate in some implementations.

Figure 13:
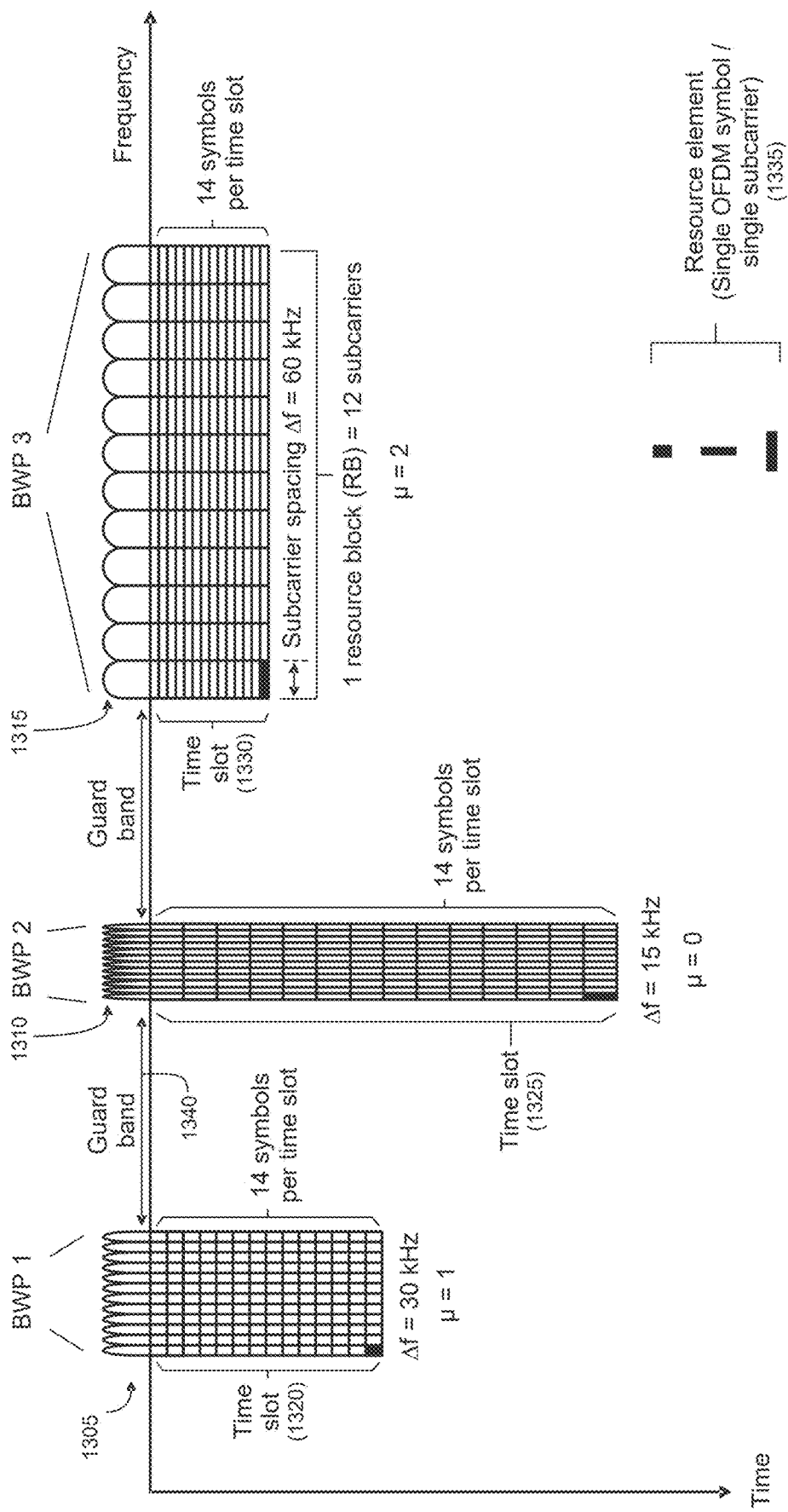
FIG. 13 shows illustrative bandwidth parts (BWP) associated with respective numerologies.

Each numerology may have a defined bandwidth part (BWP) that can have various parameters including subcarrier spacing, OFDM (orthogonal frequency-division multiplexing) symbol duration, and cyclic prefix (CP) length. A BWP is a contiguous set of physical resource blocks (RBs) for a given carrier. The RBs are selected from a contiguous subset of common RBs for a given numerology, $\mu$. FIG. 13 shows illustrative BWPs 1310, 1305, and 1315 associated with respective numerologies, $\mu=0$, 1, and 2. Frequency is shown on the horizontal axis and time is shown on the vertical axis.

It may be appreciated that a wider bandwidth may have a direct impact on the peak and user experienced data rates, however users are not always demanding high data rates. The use of wide bandwidth may imply higher idling power consumption both from RF and baseband signal processing perspectives in some cases. Thus, the concept of BWP has been introduced in 5G to thereby operate UEs with smaller bandwidth than the configured channel bandwidth, which enables the 5G air interface to be efficient while still supporting wideband operations. BWPs provide flexibility so that multiple, different signal types can be sent in a given bandwidth. Most gNBs can utilize the wider bandwidths available in 5G. UE capabilities, however, can be expected to vary and it will be more challenging for some UEs to use the larger available bandwidths. BWPs enable multiplexing of different signals and signal types for better utilization of spectrum.

Per 3GPP release 15, a given UE can be configured with a maximum of four BWPs for downlink and uplink but at a given point in time only one BWP is active for downlink and one for uplink. The BWP concept enables UEs to operate in narrow bandwidth and when a user demands more data (e.g., for bursts of traffic) it can inform the RU to enable wider bandwidth. In typical situations, UEs are expected to receive and transmit only within the frequency range configured for the active BWPs with the associated numerologies.

As shown in FIG. 13, each BWP 1305, 1310, and 1315 has a different subcarrier spacing. In 5G, subcarrier spacings of 15 kHz ($\mu=0$), 30 kHz ($\mu=1$), 60 kHz ($\mu=2$), 120 kHz ($\mu=3$), and 240 kHz ($\mu=4$) are supported. Downlink and uplink transmissions are organized into frames with 10 ms duration, each consisting of ten subframes of 1 ms. Each frame is divided into two equally-sized half-frames of five subframes each with half-frame 0 consisting of subframes 0-4 and half-frame 1 consisting of subframes 5-9. In Total, there are 10 subframes in one frame.

The lengths of the respective time slots 1320, 1325, and 1330 are different depending on different subcarrier spacing with slot length getting shorter as subcarrier spacing gets wider. The number of time slots per subframe varies with carrier spacing—with 1, 2, 4, 8, or 16 slots per subframe. The physical radio resources 1210 (FIG. 12) are depicted in FIG. 13 by the filled rectangles which represent the smallest unit of resource—the resource element 1335—which comprises a single OFDM symbol and a single subcarrier.

The utilization of mixed numerologies in 5G provides additional flexibility to efficiently serve requirements of diverse usage scenarios. However, inter-numerology interference (INI) can arise between multiplexed numerologies. INI can cause, for example, a loss of orthogonality among subcarriers of different numerologies in the frequency domain and may cause difficulties in OFDM symbol alignment in the time domain. Controlling and reducing INI may typically be performed using one or more techniques including, for example, windowing and filtering. Guard bands (representatively indicated by reference numeral 1340 in FIG. 13) may also be inserted between adjacent sub-bands utilizing different numerologies to minimize the effects of INI in the system.

Figure 14:
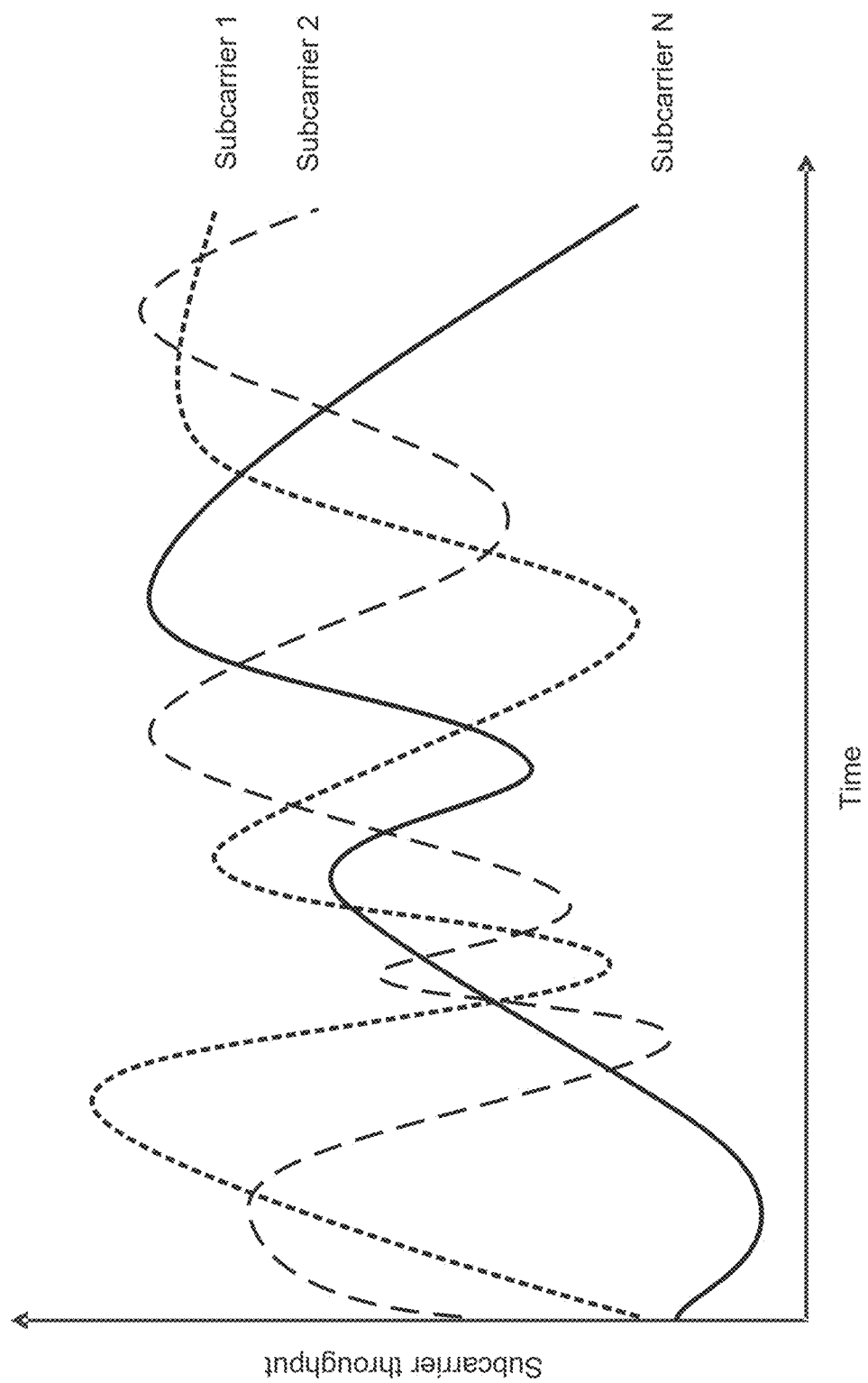
FIG. 14 shows an illustrative graph depicting the variation in throughput over time for different subcarriers.

FIG. 14 shows an illustrative graph 1400 depicting the variation in throughput over time for three different subcarriers 1, 2, N. Throughput can vary in the wireless 5G environment for various reasons such as received signal strength attenuation between transmitter and receiver, signal reflection and scattering, interference, and multipath fading. The net effect of these variations of the wireless channel is a lower signal-to-noise ratio, which leads to a high error rate and a reduction in the effective data rate, or throughput, between the RU and UE. Accordingly, 5G networks require special strategies to combat fading at the PHY layer, and intelligent scheduling schemes to provide radio resource allocation that maximizes spectrum utilization and throughput.

Figure 15:
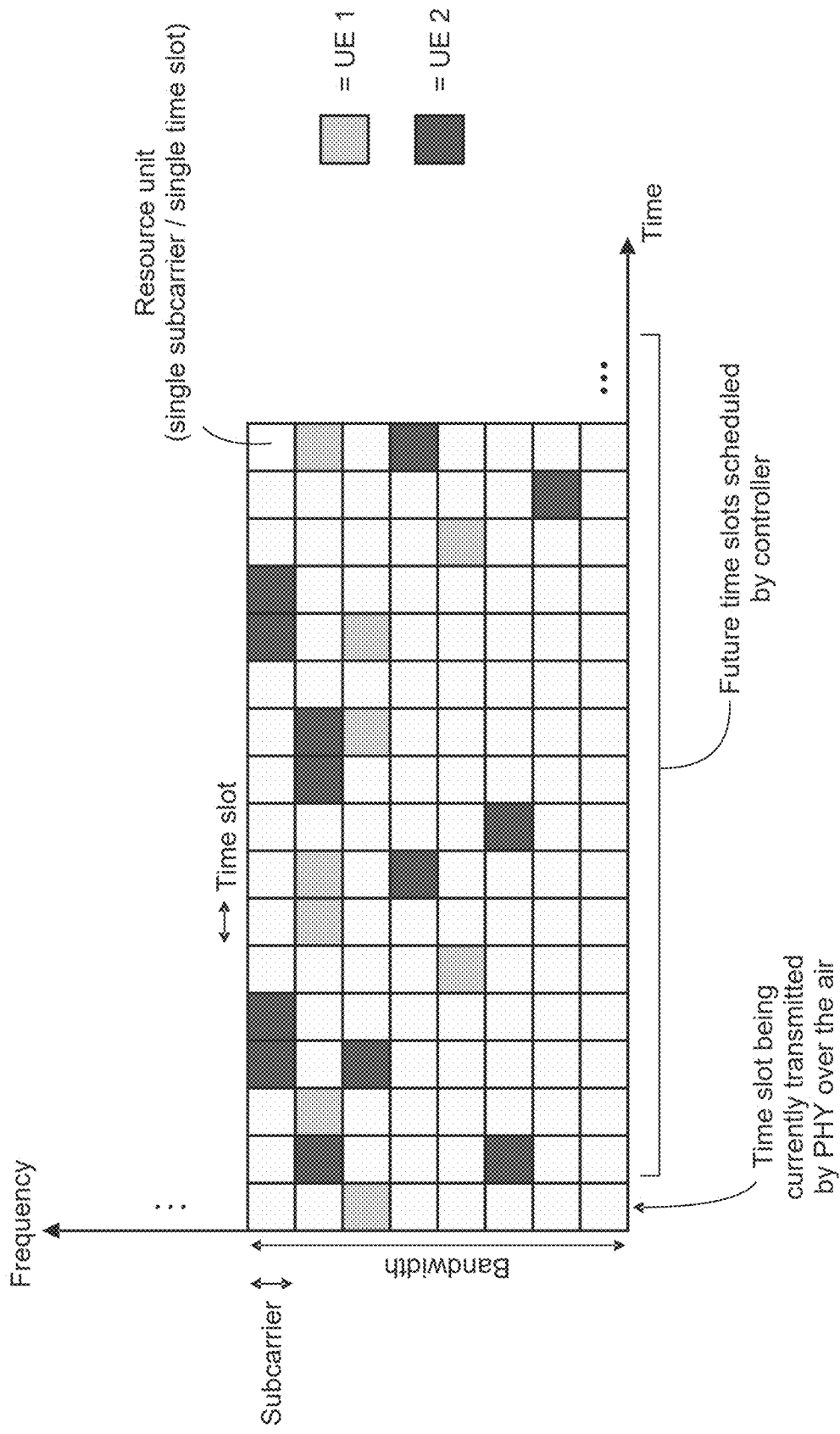
FIG. 15 is an illustrative scheduling matrix that shows how data transmissions for particular UE are scheduled by selecting subcarriers and time slots.

FIG. 15 is an illustrative scheduling matrix 1500 that shows how data transmissions for particular UE are scheduled by the controller (not shown) by selecting subcarriers and time slots for a given slice. Bandwidth is displayed on the vertical axis and time is displayed on the horizontal axis. Each square in the matrix represents an arbitrarily-represented unit of physical radio resource that is defined by a single subcarrier and a single time slot. It will be appreciated however that the presentation in FIG. 15 is chosen to aid clarity in exposition of the present principles and that the scheduling matrix could also be represented using different dimensions. In addition, the matrix shows two UE, but it will be appreciated that the scheduling may be performed for more than two in typical implementations.

As the PHY layer 720 (FIG. 7) is transmitting the current time slot (i.e., located in the first column of the matrix 1500), the controller is selecting a particular subcarrier and time slot for future transmissions of data that are queued for handling. As the controller is typically optimizing scheduling for maximum throughput and spectrum utilization for a slice, not every available subcarrier and time slot in the matrix is necessarily utilized. Subcarriers may be selected across BWP and numerologies in some cases.

FIG. 16 is a flowchart 1600 of an illustrative method that may be performed when implementing the present conversational AI system in which a foundation model is adapted for information synthesis of wireless communication specifications. Unless specifically stated, methods or steps shown in the flowchart blocks and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Block 1605 includes building a domain-specific database of wireless communication specifications. Block 1610 includes providing a base foundation large language model (LLM) for identifying relevant information from the domain-specific database in response to queries from the user made through a user interface (UI) to the conversational AI system. Block 1615 includes generating tokenized text from the domain-specific database from which word embedding vectors are generated. Block 1620 includes training the LLM using the word embedding vectors from the domain-specific database.

Block 1625 includes generating tokenized text for a query received from the user at the UI from which word embedding vectors are generated. Block 1630 includes using a context extractor to augment the query with context from the domain-specific database by comparing word embedding vectors for the query to word embedding vectors for the domain-specific database to identify matches having semantic similarities.

Block 1635 includes providing a conversational response to the user's query through the UI, the response being generated based on tailored prompts to the LLM. Block 1640 includes creating an issue for resolution by expert feedback, the issue including the user query, the response, and the context, wherein the resolved issue is incorporated into the domain-specific database.

Figure 17:
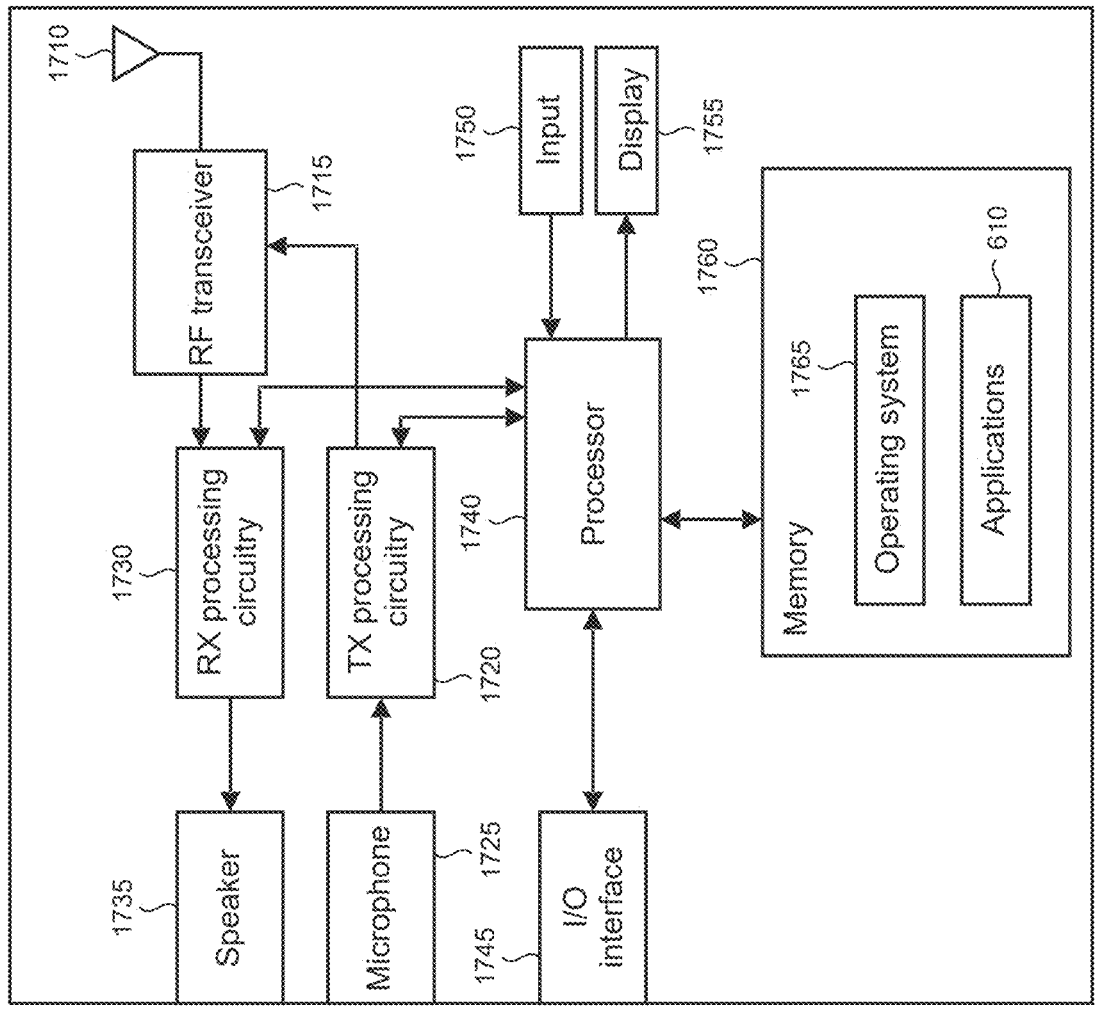
FIG. 17 is a block diagram of an illustrative UE that may be used at least in part to implement the present conversational AI system.

FIG. 17 is a block diagram of an illustrative UE 500 that may be used at least in part to implement the present conversational AI system. The embodiment of the UE 500 shown in FIG. 17 is for illustration only, and the UEs 500 shown in the drawings and described in the preceding text may have the same or similar configuration. However, it is noted that UEs may come in a wide variety of configurations, and FIG. 17 does not limit the scope of the present disclosure to any particular implementation of a UE.

The UE 500 includes an antenna 1710, a radio frequency (RF) transceiver 1715, transmit (TX) processing circuitry 1720, a microphone 1725, and receive (RX) processing circuitry 1730. The UE 500 also includes a speaker 1735, a processor 1740, an input/output (I/O) interface 1745, an input device 1750, a display 1755, and a memory 1760. The memory includes an operating system (OS) program 1765 and one or more applications 610.

The RF transceiver 1715 receives from the antenna 1710, an incoming RF signal transmitted by a gNB of a 5G network 600 (FIG. 6). The RF transceiver down-converts the incoming RF signal to generate an intermediate frequency (IF) or baseband signal. The IF or baseband signal is sent to the RX processing circuitry 1730, which generates a processed baseband signal by filtering, decoding, and/or digitizing the baseband or IF signal. The RX processing circuitry transmits the processed baseband signal to the speaker 1735 (such as for voice data) or to the processor 1740 for further processing (such as for web browsing data).

The TX processing circuitry 1720 receives analog or digital voice data from the microphone 1725 or other outgoing baseband data (such as web data, e-mail, or interactive video game data) from the processor 1740. The TX processing circuitry 1720 encodes, multiplexes, and/or digitizes the outgoing baseband data to generate a processed baseband or IF signal. The RF transceiver 1715 receives the outgoing processed baseband or IF signal from the TX processing circuitry and up-converts the baseband or IF signal to an RF signal that is transmitted via the antenna.

The processor 1740 can include one or more processors or other processing devices and execute the OS program 1765 stored in the memory 1760 to control the overall operation of the UE 500. For example, the processor may control the reception of forward channel signals and the transmission of reverse channel signals by the RF transceiver 1715, the RX processing circuitry 1730, and the TX processing circuitry 1720 in accordance with well-known principles. In some embodiments, the processor 1740 includes at least one microprocessor or microcontroller.

The processor 1740 may be configured for executing other processes and programs resident in the memory 1760. The processor can move data into or out of the memory as required by an executing process. In some embodiments, the processor may be configured to execute the applications 610 based on the OS program 1765 or in response to signals received from gNBs or an operator. The processor is also coupled to the I/O interface 1745, which provides the UE 500 with the ability to connect to other computing devices such as laptop computers and handheld computers. The I/O interface may thus function as a communication path between such accessories and the processor.

The processor 1740 is also coupled to the input device 1750 (e.g., keypad, touchscreen, buttons etc.) and the display 1755. A user of the UE 500 can typically employ the input device to enter data into the UE. For example, the display can be a liquid crystal display or other display capable of rendering text and/or graphics, video, etc., from web sites, applications and/or service providers.

The memory 1760 is coupled to the processor 1740. Part of the memory may include a random access memory (RAM), and another part of the memory may include a Flash memory or other read-only memory (ROM).

Although FIG. 17 shows one illustrative example of UE 500, it may be appreciated that various changes may be made to the drawing. For example, various components may be combined, further subdivided, or omitted and additional components may be added according to particular needs. As a particular example, the processor 1740 may be divided into multiple processors, such as one or more central processing units (CPUs) and one or more graphics processing units (GPUs). Also, while FIG. 17 depicts the UE 500 as configured as a mobile device, such as a smartphone, UEs may be configured to operate as other types of portable or stationary devices.

Figure 18:
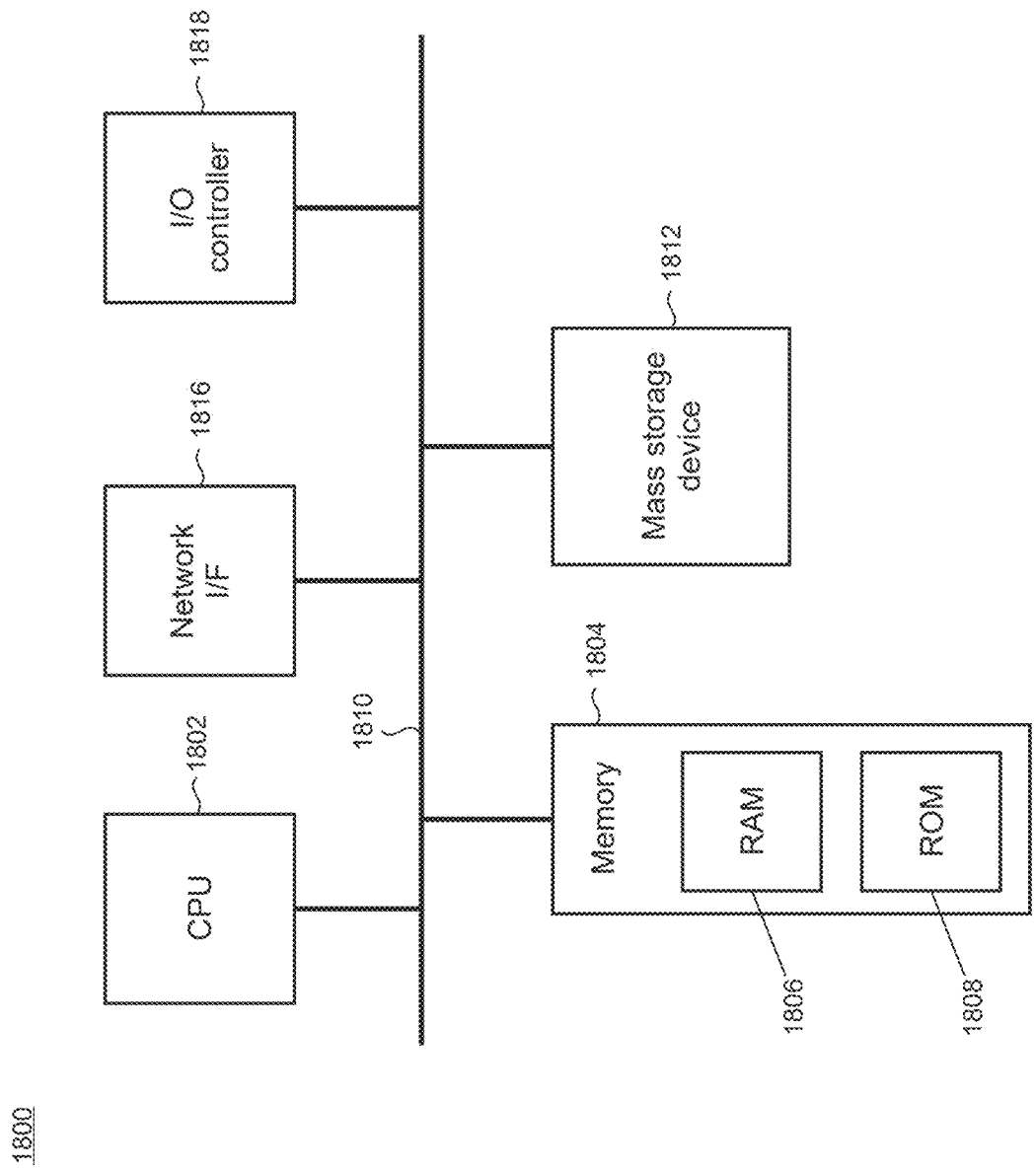
FIG. 18 is a block diagram of an illustrative server or computing device that may be used at least in part to implement the present conversational AI system.

FIG. 18 shows an illustrative architecture 1800 for a computing device, such as a server, capable of executing the various components described herein for 5G admission by verifying slice SLA guarantees. The architecture 1800 illustrated in FIG. 18 includes one or more processors 1802 (e.g., central processing unit, dedicated AI chip, graphics processing unit, etc.), a system memory 1804, including RAM (random access memory) 1806 and ROM (read only memory) 1808, and a system bus 1810 that operatively and functionally couples the components in the architecture 1800. A basic input/output system containing the basic routines that help to transfer information between elements within the architecture 1800, such as during startup, is typically stored in the ROM 1808. The architecture 1800 further includes a mass storage device 1812 for storing software code or other computer-executed code that is utilized to implement applications, the file system, and the operating system. The mass storage device 1812 is connected to the processor 1802 through a mass storage controller (not shown) connected to the bus 1810. The mass storage device 1812 and its associated computer-readable storage media provide non-volatile storage for the architecture 1800. Although the description of computer-readable storage media contained herein refers to a mass storage device, such as a hard disk or CD-ROM drive, it may be appreciated by those skilled in the art that computer-readable storage media can be any available storage media that can be accessed by the architecture 1800.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1800.

According to various embodiments, the architecture 1800 may operate in a networked environment using logical connections to remote computers through a network. The architecture 1800 may connect to the network through a network interface unit 1816 connected to the bus 1810. It may be appreciated that the network interface unit 1816 also may be utilized to connect to other types of networks and remote computer systems. The architecture 1800 also may include an input/output controller 1818 for receiving and processing input from a number of other devices, including a keyboard, mouse, touchpad, touchscreen, control devices such as buttons and switches or electronic stylus (not shown in FIG. 18). Similarly, the input/output controller 1818 may provide output to a display screen, user interface, a printer, or other type of output device (also not shown in FIG. 18).

It may be appreciated that the software components described herein may, when loaded into the processor 1802 and executed, transform the processor 1802 and the overall architecture 1800 from a general-purpose computing system into a special-purpose computing system customized to facilitate the functionality presented herein. The processor 1802 may be constructed from any number of transistors or other discrete circuit elements, which may individually or collectively assume any number of states. More specifically, the processor 1802 may operate as a finite-state machine, in response to executable instructions contained within the software modules disclosed herein. These computer-executable instructions may transform the processor 1802 by specifying how the processor 1802 transitions between states, thereby transforming the transistors or other discrete hardware elements constituting the processor 1802.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1800 in order to store and execute the software components presented herein. It also may be appreciated that the architecture 1800 may include other types of computing devices, including wearable devices, handheld computers, embedded computer systems, smartphones, PDAs, and other types of computing devices known to those skilled in the art. It is also contemplated that the architecture 1800 may not include all of the components shown in FIG. 18, may include other components that are not explicitly shown in FIG. 18, or may utilize an architecture completely different from that shown in FIG. 18.

Figure 19:
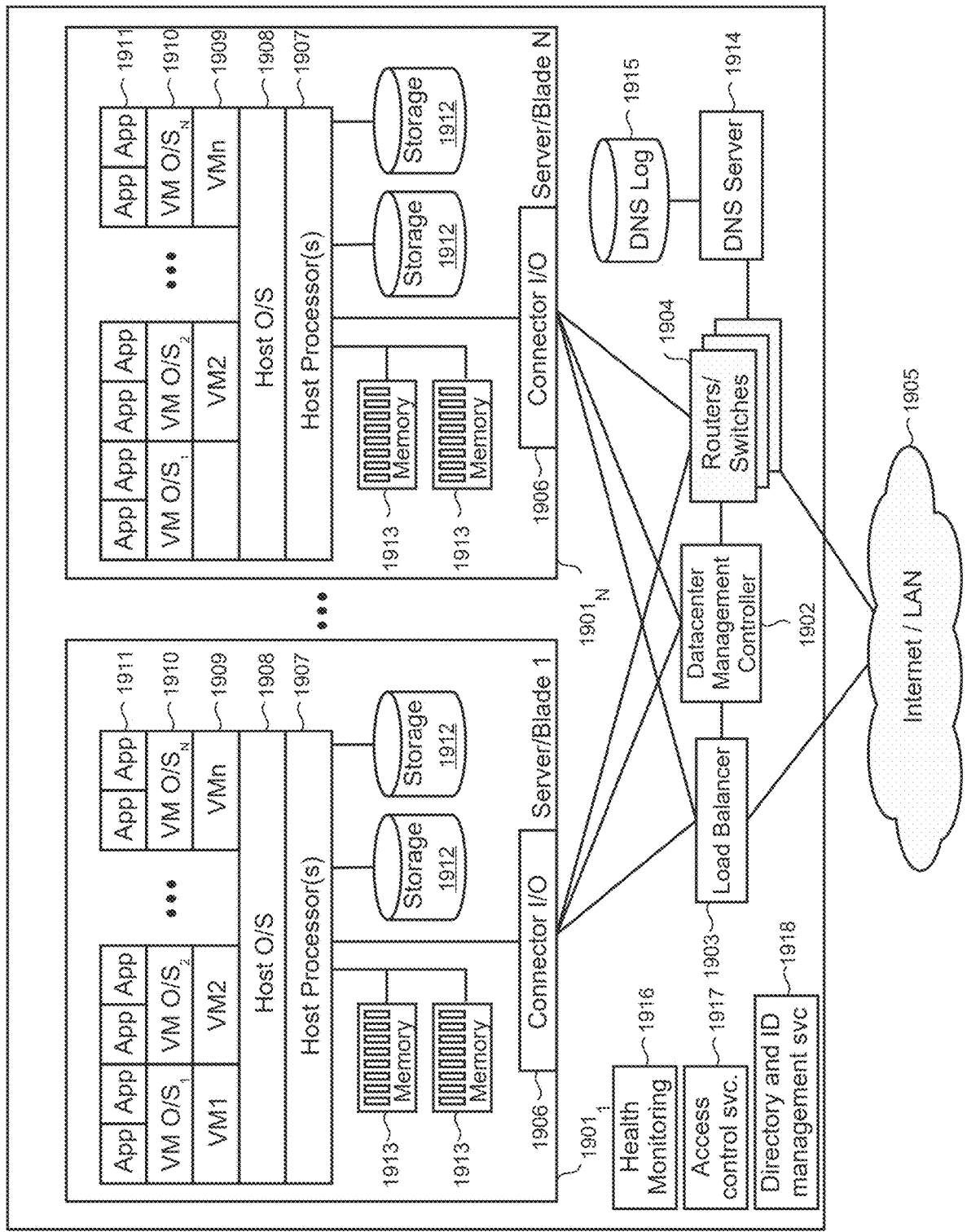
FIG. 19 is a block diagram of an illustrative datacenter that may be used at least in part to implement the present conversational AI system.

FIG. 19 is a high-level block diagram of an illustrative datacenter 1900 that provides cloud computing services or distributed computing services that may be used to implement the present conversational AI system. Datacenter 1900 may incorporate one or more of the features disclosed in the DCs shown in the drawings and disclosed in the accompanying text. A plurality of servers 1901 are managed by datacenter management controller 1902. Load balancer 1903 distributes requests and computing workloads over servers 1901 to avoid a situation wherein a single server may become overwhelmed. Load balancer 1903 maximizes available capacity and performance of the resources in datacenter 1900. Routers/switches 1904 support data traffic between servers 1901 and between datacenter 1900 and external resources and users (not shown) via an external network 1905, which may be, for example, a local area network (LAN) or the Internet.

Servers 1901 may be standalone computing devices, and/or they may be configured as individual blades in a rack of one or more server devices. Servers 1901 have an input/output (I/O) connector 1906 that manages communication with other database entities. One or more host processors 1907 on each server 1901 run a host operating system (O/S) 1908 that supports multiple virtual machines (VM) 1909. Each VM 1909 may run its own O/S so that each VM O/S 1910 on a server is different, or the same, or a mix of both. The VM O/Ss 1910 may be, for example, different versions of the same O/S (e.g., different VMs running different current and legacy versions of the Windows® operating system). In addition, or alternatively, the VM O/Ss 1910 may be provided by different manufacturers (e.g., some VMs running the Windows® operating system, while other VMs are running the Linux® operating system). Each VM 1909 may also run one or more applications (App) 1911. Each server 1901 also includes storage 1912 (e.g., hard disk drives (HDD)) and memory 1913 (e.g., RAM) that can be accessed and used by the host processors 1907 and VMs 1909 for storing software code, data, etc. In one embodiment, a VM 1909 may employ the data plane APIs as disclosed herein.

Datacenter 1900 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 1900 allows tenants to scale up or scale down resources dynamically to meet the current needs of their business. Additionally, a datacenter operator can provide usage-based services to tenants so that they pay for only the resources they use when they need to use them. For example, a tenant may initially use one VM 1909 on server $1901_1$ to run their applications 1911. When demand for an application 1911 increases, the datacenter 1900 may activate additional VMs 1909 on the same server $1901_1$ and/or on a new server $1901_N$ as needed. These additional VMs 1909 can be deactivated if demand for the application later drops.

Datacenter 1900 may offer guaranteed availability, disaster recovery, and back-up services. For example, the datacenter may designate one VM 1909 on server $1901_1$ as the primary location for the tenant's application and may activate a second VM 1909 on the same or a different server as a standby or back-up in case the first VM or server $1901_1$ fails. The datacenter management controller 1902 automatically shifts incoming user requests from the primary VM to the back-up VM without requiring tenant intervention. Although datacenter 1900 is illustrated as a single location, it will be understood that servers 1901 may be distributed to multiple locations across the globe to provide additional redundancy and disaster recovery capabilities. Additionally, datacenter 1900 may be an on-premises, private system that provides services to a single enterprise user or may be a publicly accessible, distributed system that provides services to multiple, unrelated customers and tenants or may be a combination of both.

Domain Name System (DNS) server 1914 resolves domain and host names into IP addresses for all roles, applications, and services in datacenter 1900. DNS log 1915 maintains a record of which domain names have been resolved by role. It will be understood that DNS is used herein as an example and that other name resolution services and domain name logging services may be used to identify dependencies, for example, in other embodiments, IP or packet sniffing, code instrumentation, or code tracing.

Datacenter health monitoring 1916 monitors the health of the physical systems, software, and environment in datacenter 1900. Health monitoring 1916 provides feedback to datacenter managers when problems are detected with servers, blades, processors, or applications in datacenter 1900 or when network bandwidth or communications issues arise.

Access control service 1917 determines whether users are allowed to access particular connections and services provided at the datacenter 1900. Directory and identity management service 1918 authenticates user credentials for tenants on datacenter 1900.

Figure 20:
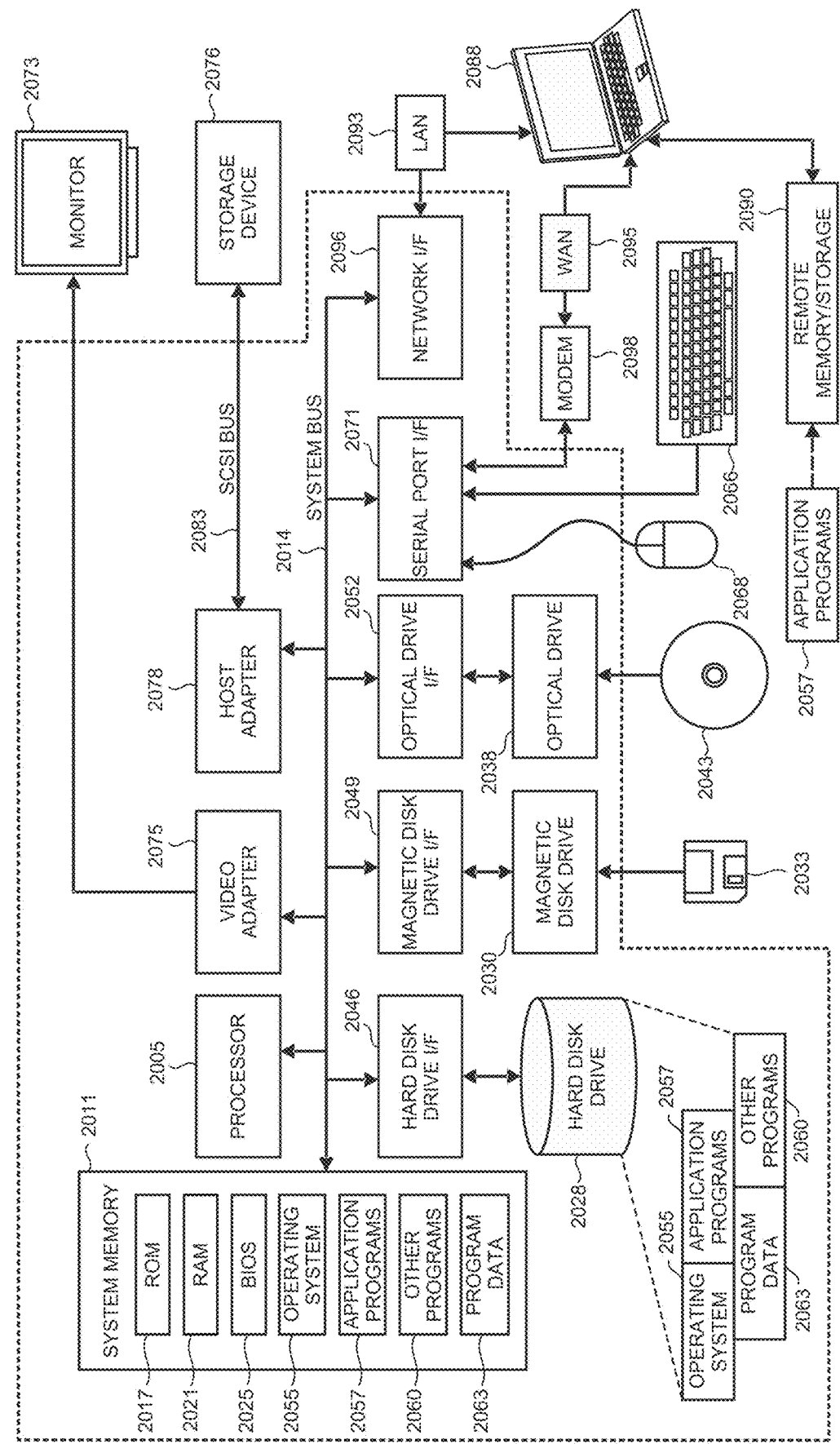
FIG. 20 is a simplified block diagram of an illustrative computer system that may be used at least in part to implement the present conversational AI system.

FIG. 20 is a simplified block diagram of an illustrative computer system 2000 such as a PC, client machine, or server with which the present conversational AI system may be implemented. Computer system 2000 includes a processor 2005, a system memory 2011, and a system bus 2014 that couples various system components including the system memory 2011 to the processor 2005. The system bus 2014 may be any of several types of bus structures including a memory bus or memory controller, a peripheral bus, or a local bus using any of a variety of bus architectures. The system memory 2011 includes read only memory (ROM) 2017 and random access memory (RAM) 2021. A basic input/output system (BIOS) 2025, containing the basic routines that help to transfer information between elements within the computer system 2000, such as during startup, is stored in ROM 2017. The computer system 2000 may further include a hard disk drive 2028 for reading from and writing to an internally disposed hard disk (not shown), a magnetic disk drive 2030 for reading from or writing to a removable magnetic disk 2033 (e.g., a floppy disk), and an optical disk drive 2038 for reading from or writing to a removable optical disk 2043 such as a CD (compact disc), DVD (digital versatile disc), or other optical media. The hard disk drive 2028, magnetic disk drive 2030, and optical disk drive 2038 are connected to the system bus 2014 by a hard disk drive interface 2046, a magnetic disk drive interface 2049, and an optical drive interface 2052, respectively. The drives and their associated computer-readable storage media provide non-volatile storage of computer-readable instructions, data structures, program modules, and other data for the computer system 2000. Although this illustrative example includes a hard disk, a removable magnetic disk 2033, and a removable optical disk 2043, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present conversational AI system. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 2033, optical disk 2043, ROM 2017, or RAM 2021, including an operating system 2055, one or more application programs 2057, other program modules 2060, and program data 2063. A user may enter commands and information into the computer system 2000 through input devices such as a keyboard 2066 and pointing device 2068 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2005 through a serial port interface 2071 that is coupled to the system bus 2014, but may be connected by other interfaces, such as a parallel port, game port, or universal serial bus (USB). A monitor 2073 or other type of display device is also connected to the system bus 2014 via an interface, such as a video adapter 2075. In addition to the monitor 2073, personal computers typically include other peripheral output devices (not shown), such as speakers and printers. The illustrative example shown in FIG. 20 also includes a host adapter 2078, a Small Computer System Interface (SCSI) bus 2083, and an external storage device 2076 connected to the SCSI bus 2083.

The computer system 2000 is operable in a networked environment using logical connections to one or more remote computers, such as a remote computer 2088. The remote computer 2088 may be selected as another personal computer, a server, a router, a network PC, a peer device, or other common network node, and typically includes many or all of the elements described above relative to the computer system 2000, although only a single representative remote memory/storage device 2090 is shown in FIG. 20. The logical connections depicted in FIG. 20 include a local area network (LAN) 2093 and a wide area network (WAN) 2095. Such networking environments are often deployed, for example, in offices, enterprise-wide computer networks, intranets, and the Internet.

When used in a LAN networking environment, the computer system 2000 is connected to the local area network 2093 through a network interface or adapter 2096. When used in a WAN networking environment, the computer system 2000 typically includes a broadband modem 2098, network gateway, or other means for establishing communications over the wide area network 2095, such as the Internet. The broadband modem 2098, which may be internal or external, is connected to the system bus 2014 via a serial port interface 2071. In a networked environment, program modules related to the computer system 2000, or portions thereof, may be stored in the remote memory storage device 2090. It is noted that the network connections shown in FIG. 20 are illustrative and other means of establishing a communications link between the computers may be used depending on the specific requirements of an application of the present conversational AI system.

Various exemplary embodiments of the present adapting foundation models for information synthesis of wireless communication specifications are now presented by way of illustration and not as an exhaustive list of all embodiments. An example includes a method for synthesizing information from wireless communication specifications using a conversational artificial intelligence (AI) system employable by a user, comprising: building a domain-specific database of wireless communication specifications; providing a base foundation large language model (LLM) for identifying relevant information from the domain-specific database in response to queries from the user made through a user interface (UI) to the conversational AI system; generating tokenized text from the domain-specific database from which word embedding vectors are generated; training the LLM using the word embedding vectors from the domain-specific database; generating tokenized text for a query received from the user at the UI from which word embedding vectors are generated; using a context extractor to augment the query with context from the domain-specific database by comparing word embedding vectors for the query to word embedding vectors for the domain-specific database to identify matches having semantic similarities; providing a conversational response to the user's query through the UI, the response being generated based on tailored prompts to the LLM; and creating an issue for resolution by expert feedback, the issue including the user query, the response, and the context, wherein the resolved issue is incorporated into the domain-specific database.

In another example, the UI to the conversational AI system is configured as a question-and-answer UI. In another example, responses provided through the UI include citations to the wireless communication specifications or sources of data for the responses. In another example, the method further comprises appending metadata to text that is extracted from the domain-specific database, the metadata identifying the sources of data. In another example, the method further comprises using few-shot machine learning for prompt engineering. In another example, the wireless communication specifications comprise documents published by one of 3GPP, O-RAN, or WiFi. In another example, the method further comprises applying fine-tuning to the base LLM to create a fine-tuned LLM.

A further example includes a computer-readable storage device storing computer-executable instructions, which when executed by at least one processor in a computing device, synthesize information from wireless communication specifications using a conversational artificial intelligence (AI) system employable by a user, the computer-readable storage device including instructions executable by the at least one processor for: building a domain-specific database of wireless communication specifications; providing a base foundation large language model (LLM) for identifying relevant information from the domain-specific database in response to queries from the user made through a user interface (UI) to the conversational AI system; generating tokenized text from the domain-specific database from which word embedding vectors are generated; training the LLM using the word embedding vectors from the domain-specific database; generating tokenized text for a query received from the user at the UI from which word embedding vectors are generated; using a context extractor to augment the query with context from the domain-specific database by comparing word embedding vectors for the query to word embedding vectors for the domain-specific database to identify matches having semantic similarities; providing a conversational response to the user's query through the UI, the response being generated based on tailored prompts to the LLM; and creating an issue for resolution by expert feedback, the issue including the user query, the response, and the context, wherein the resolved issue is incorporated into the domain-specific database.

In another example, the UI to the conversational AI system is configured as a question-and-answer UI. In another example, responses provided through the UI include citations to the wireless communication specifications or sources of data for the responses. In another example, the computer-readable storage device further comprises appending metadata to text that is extracted from the domain-specific database, the metadata identifying the sources of data. In another example, the computer-readable storage device further comprises using few-shot machine learning for prompt engineering. In another example, the wireless communication specifications comprise documents published by one of 3GPP, O-RAN, or WiFi. In another example, the computer-readable storage device further comprises applying fine-tuning to the base LLM to create a fine-tuned LLM.

A further example includes a computing device for providing artificial intelligence (AI) entity-specific feedback, comprising: a memory for storing executable program code; and at least one processor, functionally coupled to the memory, the processor being responsive to computer-executable instructions contained in the program code and operative for building a domain-specific database of wireless communication specifications; providing a base foundation large language model (LLM) for identifying relevant information from the domain-specific database in response to queries from a user made through a user interface (UI) to a conversational AI system; generating tokenized text from the domain-specific database from which word embedding vectors are generated; training the LLM using the word embedding vectors from the domain-specific database; generating tokenized text for a query received from the user at the UI from which word embedding vectors are generated; using a context extractor to augment the query with context from the domain-specific database by comparing word embedding vectors for the query to word embedding vectors for the domain-specific database to identify matches having semantic similarities; and providing a conversational response to the user's query through the UI, the response being generated based on tailored prompts to the LLM.

In another example, the computing device is configured as a server located in an edge datacenter. In another example, the computing device is configured as a server implementing MEC (multi-access edge computing) functionality. In another example, the computer-executed instructions further cause the processor to be operative for incorporating a history of previous queries and responses into the LLM. In another example, the computer-executed instructions further cause the processor to be operative for creating an issue for resolution by expert feedback, the issue including the user query, the response, and the context. In another example, the computer-executed instructions further cause the processor to be operative for incorporating a resolved issue into the domain-specific database.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for synthesizing information from wireless communication specifications using a conversational artificial intelligence (AI) system employable by a user, comprising:
   building a domain-specific database of wireless communication specifications;
   providing a base foundation large language model (LLM) for identifying relevant information from the domain-specific database in response to queries from the user made through a user interface (UI) to the conversational AI system;
   generating tokenized text from the domain-specific database from which word embedding vectors are generated;
   training the LLM using the word embedding vectors from the domain-specific database;
   generating tokenized text for a query received from the user at the UI from which word embedding vectors are generated;
   using a context extractor to augment the query with context from the domain-specific database by comparing word embedding vectors for the query to word embedding vectors for the domain-specific database to identify matches having semantic similarities;
   providing a conversational response to the user's query through the UI, the response being generated based on tailored prompts to the LLM; and
   creating an issue for resolution by expert feedback, the issue including the user query, the response, and the context, wherein the resolved issue is incorporated into the domain-specific database.

2. The method of claim 1, wherein the UI to the conversational AI system is configured as a question-and-answer UI.

3. The method of claim 2, wherein responses provided through the UI include citations to the wireless communication specifications or sources of data for the responses.

4. The method of claim 3, further comprising appending metadata to text that is extracted from the domain-specific database, the metadata identifying the sources of data.

5. The method of claim 1, further comprising using few-shot machine learning for prompt engineering.

6. The method of claim 1, wherein the wireless communication specifications comprise documents published by one of 3GPP, O-RAN, or WiFi.

7. The method of claim 1, further comprising applying fine-tuning to the base LLM to create a fine-tuned LLM.

8. A computer-readable storage device storing computer-executable instructions, which when executed by at least one processor in a computing device, synthesize information from wireless communication specifications using a conversational artificial intelligence (AI) system employable by a user, the computer-readable storage device including instructions executable by the at least one processor for:
building a domain-specific database of wireless communication specifications;
providing a base foundation large language model (LLM) for identifying relevant information from the domain-specific database in response to queries from the user made through a user interface (UI) to the conversational AI system;
generating tokenized text from the domain-specific database from which word embedding vectors are generated;
training the LLM using the word embedding vectors from the domain-specific database;
generating tokenized text for a query received from the user at the UI from which word embedding vectors are generated;
using a context extractor to augment the query with context from the domain-specific database by comparing word embedding vectors for the query to word embedding vectors for the domain-specific database to identify matches having semantic similarities;
providing a conversational response to the user's query through the UI, the response being generated based on tailored prompts to the LLM; and
creating an issue for resolution by expert feedback, the issue including the user query, the response, and the context, wherein the resolved issue is incorporated into the domain-specific database.

9. The computer-readable storage device of claim 8, wherein the UI to the conversational AI system is configured as a question-and-answer UI.

10. The computer-readable storage device of claim 9, wherein responses provided through the UI include citations to the wireless communication specifications or sources of data for the responses.

11. The computer-readable storage device of claim 10, further comprising appending metadata to text that is extracted from the domain-specific database, the metadata identifying the sources of data.

12. The computer-readable storage device of claim 8, further comprising using few-shot machine learning for prompt engineering.

13. The computer-readable storage device of claim 8, wherein the wireless communication specifications comprise documents published by one of 3GPP, O-RAN, or WiFi.

14. The computer-readable storage device of claim 8, further comprising applying fine-tuning to the base LLM to create a fine-tuned LLM.

15. A computing device for providing artificial intelligence (AI) entity-specific feedback, comprising:
a memory for storing executable program code; and
at least one processor, functionally coupled to the memory, the processor being responsive to computer-executable instructions contained in the program code and operative for
building a domain-specific database of wireless communication specifications;
providing a base foundation large language model (LLM) for identifying relevant information from the domain-specific database in response to queries from a user made through a user interface (UI) to a conversational AI system;
generating tokenized text from the domain-specific database from which word embedding vectors are generated;
training the LLM using the word embedding vectors from the domain-specific database;
generating tokenized text for a query received from the user at the UI from which word embedding vectors are generated;
using a context extractor to augment the query with context from the domain-specific database by comparing word embedding vectors for the query to word embedding vectors for the domain-specific database to identify matches having semantic similarities; and
providing a conversational response to the user's query through the UI, the response being generated based on tailored prompts to the LLM.

16. The computing device of claim 15 as configured as a server located in an edge datacenter.

17. The computing device of claim 15 as configured as a server implementing MEC (multi-access edge computing) functionality.

18. The computing device of claim 15 in which the computer-executed instructions further cause the processor to be operative for incorporating a history of previous queries and responses into the LLM.

19. The computing device of claim 15 in which the computer-executed instructions further cause the processor to be operative for creating an issue for resolution by expert feedback, the issue including the user query, the response, and the context.

20. The computing device of claim 19 in which the computer-executed instructions further cause the processor to be operative for incorporating a resolved issue into the domain-specific database.

* * * * *